(12) United States Patent
Matlin

(10) Patent No.: US 10,649,422 B2
(45) Date of Patent: *May 12, 2020

(54) VARIABLE HEIGHT PLATFORM DEVICE

(71) Applicant: Fellowes, Inc., Itasca, IL (US)

(72) Inventor: Tai Hoon K. Matlin, Round Lake Beach, IL (US)

(73) Assignee: FELLOWES, INC., Itasca, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/142,265

(22) Filed: Sep. 26, 2018

(65) Prior Publication Data

US 2019/0025781 A1   Jan. 24, 2019

Related U.S. Application Data

(63) Continuation of application No. 15/200,180, filed on Jul. 1, 2016, now Pat. No. 10,114,352.

(Continued)

(51) Int. Cl.
*G05B 15/02* (2006.01)
*A47B 9/16* (2006.01)
(Continued)

(52) U.S. Cl.
CPC ............... *G05B 15/02* (2013.01); *A47B 9/02* (2013.01); *A47B 9/10* (2013.01); *A47B 9/16* (2013.01); *A47B 2200/0056* (2013.01)

(58) Field of Classification Search
CPC .... A47B 9/16; A47B 9/10; A47B 9/12; B66F 7/065; B66F 11/042; B66F 1/06
(Continued)

(56) References Cited

U.S. PATENT DOCUMENTS

| 1,714,244 A | 5/1929 | Harry |
| D142,211 S | 8/1945 | Glukes |

(Continued)

FOREIGN PATENT DOCUMENTS

| CN | 203776371 U | 8/2014 |
| EP | 2842458 A1 | 3/2015 |

(Continued)

OTHER PUBLICATIONS

Search Report dated Dec. 19, 2016 in United Kingdom Application No. GB1611578.4.

(Continued)

*Primary Examiner* — Jose V Chen
(74) *Attorney, Agent, or Firm* — Pillsbury Winthrop Shaw Pittman LLP

(57) ABSTRACT

A variable height workstation system includes a base, a variable height platform, a lift mechanism, and a sensor arrangement. The lift mechanism is configured to move the variable height platform within a range of motion between a fully lowered position and a raised position. The sensor arrangement is operatively connected to the variable height platform. The sensor arrangement is configured to sense the position and movement of a user on, above and around the variable height platform for outputting data to determine how the user is positioned on, above and around the variable height platform in comparison to a predetermined target position.

10 Claims, 23 Drawing Sheets

Related U.S. Application Data

(60) Provisional application No. 62/187,435, filed on Jul. 1, 2015.

(51) Int. Cl.
*A47B 9/10* (2006.01)
*A47B 9/02* (2006.01)

(58) Field of Classification Search
USPC ............ 108/147, 145, 144.11; 254/122, 124, 254/2 C, 8 C, 9 C
See application file for complete search history.

(56) References Cited

U.S. PATENT DOCUMENTS

| | | | |
|---|---|---|---|
| 2,624,535 A | 1/1953 | Bollhoefer | |
| 2,843,418 A | 7/1958 | Gray | |
| 3,049,388 A | 8/1962 | Brown | |
| 4,405,116 A | 9/1983 | Eisenberg | |
| 4,477,045 A | 10/1984 | Karasawa | |
| 4,640,488 A | 2/1987 | Sakamoto | |
| 4,651,652 A | 3/1987 | Wyckoff | |
| 4,753,419 A | 6/1988 | Johansson | |
| 5,174,223 A | 12/1992 | Nagy | |
| 5,211,367 A | 5/1993 | Musculus | |
| 5,224,429 A | 7/1993 | Borgman | |
| 5,722,516 A | 3/1998 | Forni et al. | |
| 5,729,430 A | 3/1998 | Johnson | |
| 5,833,198 A | 11/1998 | Graetz | |
| 5,957,426 A | 9/1999 | Brodersen | |
| 6,286,629 B1 | 9/2001 | Saunders | |
| 6,336,627 B1 | 1/2002 | Fujita | |
| 6,352,037 B1* | 3/2002 | Doyle | A47B 9/00 108/147 |
| 6,401,631 B1 | 6/2002 | Kane et al. | |
| 6,516,478 B2 | 2/2003 | Cook et al. | |
| 7,246,784 B1 | 7/2007 | Lopez | |
| 7,677,518 B2 | 3/2010 | Chouinard | |
| 7,908,981 B2 | 3/2011 | Agee | |
| D660,308 S | 5/2012 | Huang | |
| 8,413,594 B2 | 4/2013 | Ensley | |
| 8,424,883 B1 | 4/2013 | Ramos | |
| 8,662,477 B2 | 3/2014 | Bacon | |
| 8,839,723 B2 | 9/2014 | Hazzard | |
| 8,947,215 B2 | 2/2015 | Mandel et al. | |
| 8,967,057 B2 | 3/2015 | Quiring et al. | |
| 9,038,549 B1* | 5/2015 | Zebarjad | A47B 9/02 108/147 |
| 9,113,703 B2 | 8/2015 | Flaherty | |
| 9,271,567 B2 | 3/2016 | Wu | |
| 9,277,809 B2 | 3/2016 | Flaherty et al. | |
| 9,486,070 B2* | 11/2016 | Labrosse | A47B 21/02 |
| 9,554,644 B2 | 1/2017 | Flaherty et al. | |
| 10,114,352 B2* | 10/2018 | Matlin | A47B 9/16 |
| 2002/0046684 A1 | 4/2002 | Lin | |
| 2005/0147181 A1 | 7/2005 | Schill | |
| 2007/0034125 A1 | 2/2007 | Lo | |
| 2009/0078167 A1 | 3/2009 | Ellegaard | |
| 2009/0078171 A1 | 3/2009 | Frost | |
| 2011/0168064 A1 | 7/2011 | Jahnsen | |
| 2012/0248263 A1 | 10/2012 | Grotenhuis | |
| 2013/0199419 A1 | 8/2013 | Hjelm | |
| 2014/0096706 A1 | 4/2014 | Labrosse | |
| 2015/0014609 A1 | 1/2015 | Mohr | |
| 2015/0120238 A1 | 4/2015 | Marvit | |
| 2016/0051042 A1 | 2/2016 | Koch | |
| 2016/0260019 A1 | 2/2016 | Riquelme | |
| 2016/0309889 A1 | 10/2016 | Lin | |
| 2016/0345722 A1 | 12/2016 | Chen | |
| 2017/0052517 A1 | 2/2017 | Tsai | |
| 2017/0135466 A1 | 5/2017 | Radlov | |
| 2017/0135587 A1 | 5/2017 | Desroches | |
| 2017/0164728 A1 | 6/2017 | Chang | |
| 2017/0251802 A1 | 9/2017 | Lu | |
| 2017/0303679 A1 | 10/2017 | Tseng | |
| 2017/0347792 A1 | 12/2017 | Bergmann | |
| 2018/0000240 A1 | 1/2018 | Yamamoto | |
| 2018/0020831 A1 | 1/2018 | Lenz | |
| 2018/0103753 A1 | 4/2018 | Davidsen | |
| 2018/0110324 A1 | 4/2018 | Keller et al. | |
| 2018/0242728 A1 | 8/2018 | Hansen | |
| 2018/0344023 A1 | 12/2018 | Andersson | |
| 2019/0029412 A1 | 1/2019 | Gibson | |
| 2019/0029413 A1 | 1/2019 | Patton | |
| 2019/0098994 A1 | 4/2019 | Smed | |

FOREIGN PATENT DOCUMENTS

| | | |
|---|---|---|
| EP | 2842458 A1 | 4/2015 |
| EP | 2979579 A1 | 2/2016 |
| EP | 3311693 A1 | 4/2018 |
| FR | 2309176 A | 11/1976 |
| JP | 2926688 A1 | 10/2015 |

OTHER PUBLICATIONS

International Search Report and Written Opinion dated Aug. 1, 2018 in International Application PCT/US2018/036678.

Written Opinion dated Aug. 26, 2019 in International Application PCT/US2018/036678.

* cited by examiner

VARIABLE HEIGHT PLATFORM DEVICE

CROSS-REFERENCE TO RELATED APPLICATIONS

This patent application is a continuation of U.S. patent application Ser. No. 15/200,180 filed Jul. 1, 2016, which claims benefit under 35 U.S.C. § 119(e) of U.S. Provisional Patent Application Ser. No. 62/187,435, filed on Jul. 1, 2015, all of which are incorporated herein by reference in their entireties.

BACKGROUND

Field

The present patent application relates to a variable height desktop workstation system. For example, the present patent application relates to adjustable and moving work surfaces such as manual and powered sit/stand tables or devices, desktop sit/stand devices with keyboard managers, monitor stands and risers being secondary.

Description of Related Art

A typical platform device in the field of this present application would be the following:

Sit/stand devices: Sit/stand devices typically allow an office worker to conduct their tasks in a sitting position and a standing position by raising a work surface with a keyboard and a mouse along with a monitor or several monitors to be raised and lowered with the keyboard and mouse surfaces. Others may be large enough to hold a laptop docking stations in addition to the keyboard, the mouse and the monitor(s) and/or a laptop in conjunction with or by itself. These types of devices are described in the following patents: U.S. Pat. No. 8,839,723 (sit/stand with base and support column at an obtuse angle), U.S. Pat. No. 7,677,518 (stand with upper and lower components adjustable relative to each other), and U.S. Patent Application Publication No. 2012/0248263 (monitor mounting device with improved flexibility and support for flat screens).

FIG. 1 illustrates an exemplary prior art desktop motorized variable platform device. As shown in FIG. 1, the device includes an upper platform 15 and a lower platform 16 which are adjustable relative to each other. A motor is activated by a switch 66 that raises or lowers the upper and lower platforms 15 and 16 in unison by way of a motorized scissors type mechanism which partially consists of assembly arms 30, 30b and 32, 32b.

FIG. 2 illustrates an exemplary prior art manually operated sit/stand platform device 100. The sit/stand platform device 100 has a base 132 and a support column 104 which rises at an obtuse angle from the surface of the desk in which it is placed (e.g., looking at the support column 104 from an operator's position). Platform 112 and monitor mount 110 move up and down the support column 104 by a manual means (i.e., an operator lifts or pushes down the platform 112 to a desired position).

Another related group of products is a table or desk in which the entire working surface moves up and down by most commonly raising the work surface by extending and retracting the height of the table legs. These types of devices are described in the following patents: U.S. Pat. No. 4,651,652 (a desk with a pulley and gas spring actuated rising working surface), U.S. Pat. No. 5,174,223 (an ergonomic computer workstation which accommodates users in various sitting and standing positions), U.S. Pat. No. 5,224,429 (supporting work station with front and back tops having separate powered drives with a controller and storage of height positions), and U.S. Patent Application Publication No. 2014/0096706 (sit/stand table with power drive, electronic controller with inputs—ultra sonic range finder or Passive Infrared (PIR) detects presence of a user, where the sensor is mounted on the underside of the table).

FIG. 3 illustrates an exemplary prior art desk with a gas spring 20 actuated by a pedal 24, which activates rising a working surface 40.

FIG. 4 illustrates an exemplary prior art work station 10 with two working surfaces front surface 28 and back surface 47 having separate powered drives within legs 18. A controller is configured to control the surfaces 28 and 47 independently using an input device 92. The chosen positions may be stored in a memory.

FIG. 5 illustrates an exemplary prior art sit/stand table 10 with a power drive telescoping legs 18, 18b, and an electronic controller with an input device 26. An ultra-sonic range finder or Passive Infrared (PIR) 27 is configured to detect the general presence of an operator. The sensor is mounted on the underside of the table and specifically points towards the operator.

Monitor stands: Monitor stands allow the typical computer monitor to be raised and mounted to a particular height and distance so as to allow the person viewing the monitor to view it at a recommended height which eases neck and eye strain associated to viewing monitors at incorrect viewing angles and distances. These monitor stands typically use a known standardized mounting arrangement sometimes referred to a VESA mount standard allowing a monitor to be mounted to the stand from the back of the unit without its base attached. These types of stands can also have multiple monitor mounts as to allow several monitors to be viewed and used at the same time. An example of these types of devices can be found in the following patent: Design U.S. Pat. No. 660,308 (ornamental design for a monitor stand).

Monitor risers: Monitor risers raise the entire monitor and the base it resides on to a surface higher than the desktop itself. The raised surface if set correctly, allows the monitor to reside at a height which improves the viewing angle for the user. The improved viewing angle eases neck strain typically associated with looking at monitors set to the incorrect height. An example of these types of devices can be found in the following patent: U.S. Pat. No. 5,729,430 (monitor stand designed to fit into a corner of a desk).

Keyboard managers and input device platforms: Keyboard managers typically adjust to allow the subject to set the keyboard at an optimal height and angle to have the recommended elbow bend angle, and the hands at the optimal position above the keyboard and input device surface so as to allow the wrist to be in an optimal position and to not be overly strained and flexed during use. An example of these types of devices can be found in the following patent: U.S. Pat. No. 5,211,367 (keyboard support with gas strut lift assist).

All the above devices endeavor to support an individual's ergonomic health and general wellbeing, some more so than others. Aspects of the present patent application documented herein will improve all the devices mentioned above along with any similar devices which may not have been previously mentioned.

SUMMARY

In one embodiment of the present patent application, a variable height desktop workstation system is provided. The variable height desktop workstation system includes a base, a variable height platform, a lift mechanism, and a secondary force assist device. The lift mechanism is configured to move the variable height platform within a range of motion between a fully lowered position and a raised position. The lift mechanism comprises a plurality of articulated members and has a lower raising force leverage in a lower part of the range of motion and a higher raising force leverage in an upper part of the range of motion. The secondary force assist device is configured to provide an additional force to the lift mechanism directed to the variable height platform in an upward direction from the fully lowered position towards the raised position only in the lower part of the range of motion so as to compensate for the lower raising force leverage of the lift mechanism.

In another embodiment of the present patent application, a variable height desktop workstation system is provided. The variable height desktop workstation system comprises a base, a variable height platform, a lift mechanism, and a motor. The lift mechanism is configured to move the variable height platform within a range of motion between a fully lowered position and a raised position. The lift mechanism comprises a plurality of articulated members. The motor is configured to provide limited adjustment movements to the variable height platform, when the variable height platform is in the raised position, to change the position of a user.

In yet another embodiment of the present patent application, a variable height workstation system is provided. The variable height workstation system comprises a base, a variable height platform, a lift mechanism, and a sensor arrangement. The lift mechanism is configured to move the variable height platform within a range of motion between a fully lowered position and a raised position. The sensor arrangement is operatively connected to the variable height platform. The sensor arrangement is configured to sense the position and movement of a user on, above and around the variable height platform for outputting data to determine how the user is positioned on, above and around the variable height platform in comparison to a predetermined target position.

In yet another embodiment of the present patent application, a variable height workstation system is provided. The variable height workstation system comprises a base, a variable height platform, a lift mechanism, a sensor arrangement, and a display device with a processor. The lift mechanism is configured to move the variable height platform within a range of motion between a fully lowered position and a raised position. The sensor arrangement is operatively connected to the variable height platform. The sensor arrangement is configured to sense the position and movement of a user on, above and around the variable height platform for outputting data. The processor is configured to: receive the data from the sensor arrangement, compare the received data to a predetermined target position, and display an indication of the comparison to the user.

In yet another embodiment, a variable height workstation system is provided. The variable height workstation system comprises a base; a variable height platform; a lift mechanism; and a sensor arrangement. The lift mechanism is configured to move the variable height platform within a range of motion between a fully lowered position and a raised position. The sensor arrangement is operatively connected to the variable height platform. The sensor arrangement is configured to sense the position and movement of a user on, above and around the variable height platform and output data for determining the user's activity with the variable height platform in comparison to a predetermined target user's activity.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE DRAWINGS

Figure 1:
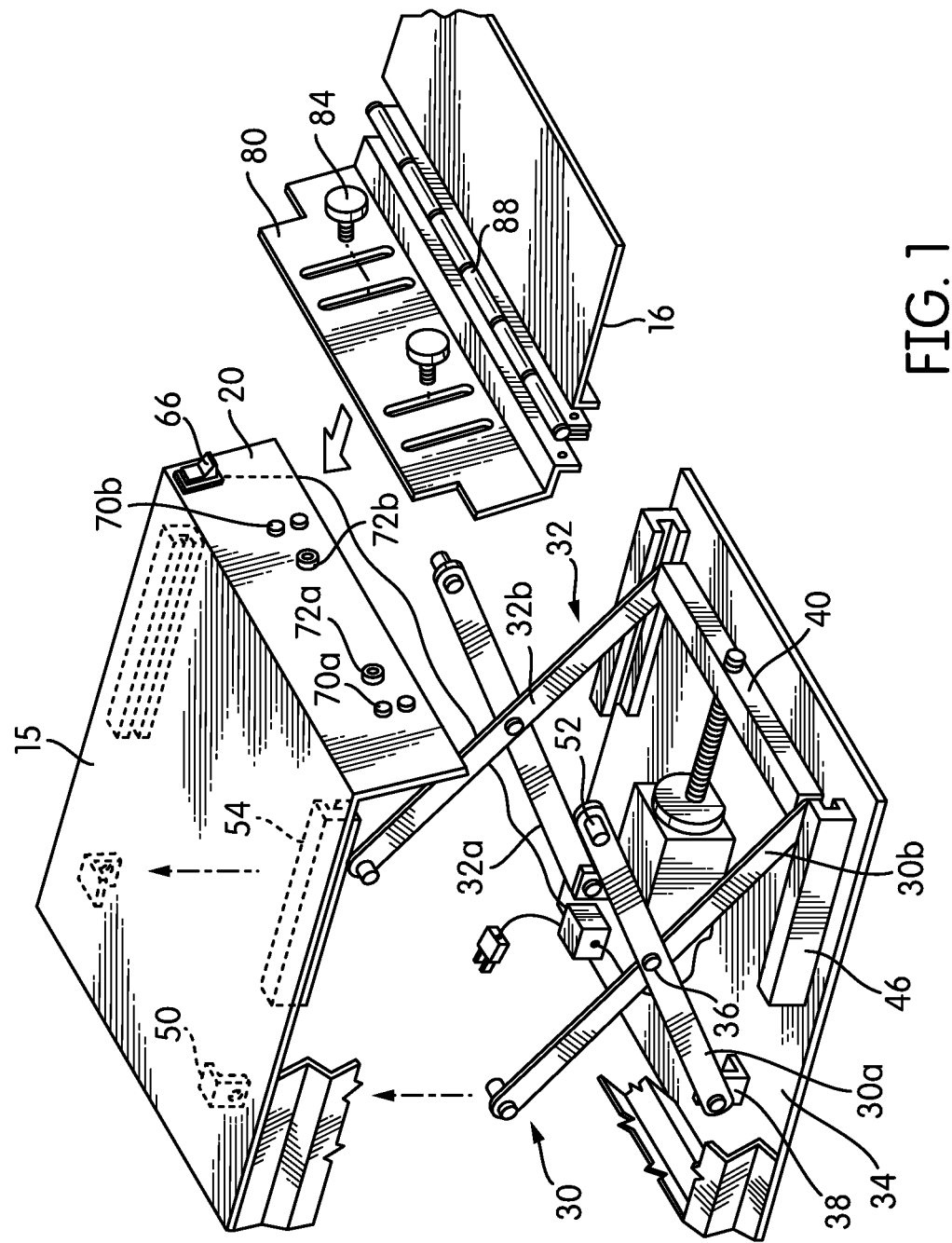
FIG. 1 illustrates an exemplary prior art desktop motorized variable platform device.
Figure 2:
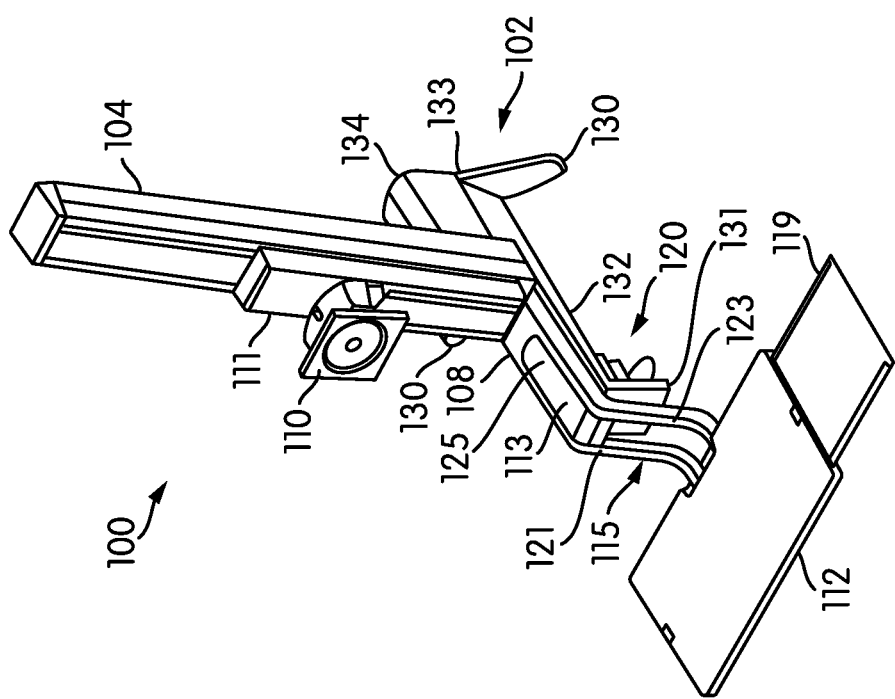
FIG. 2 illustrates an exemplary prior art manually operated sit/stand platform device.
Figure 3:
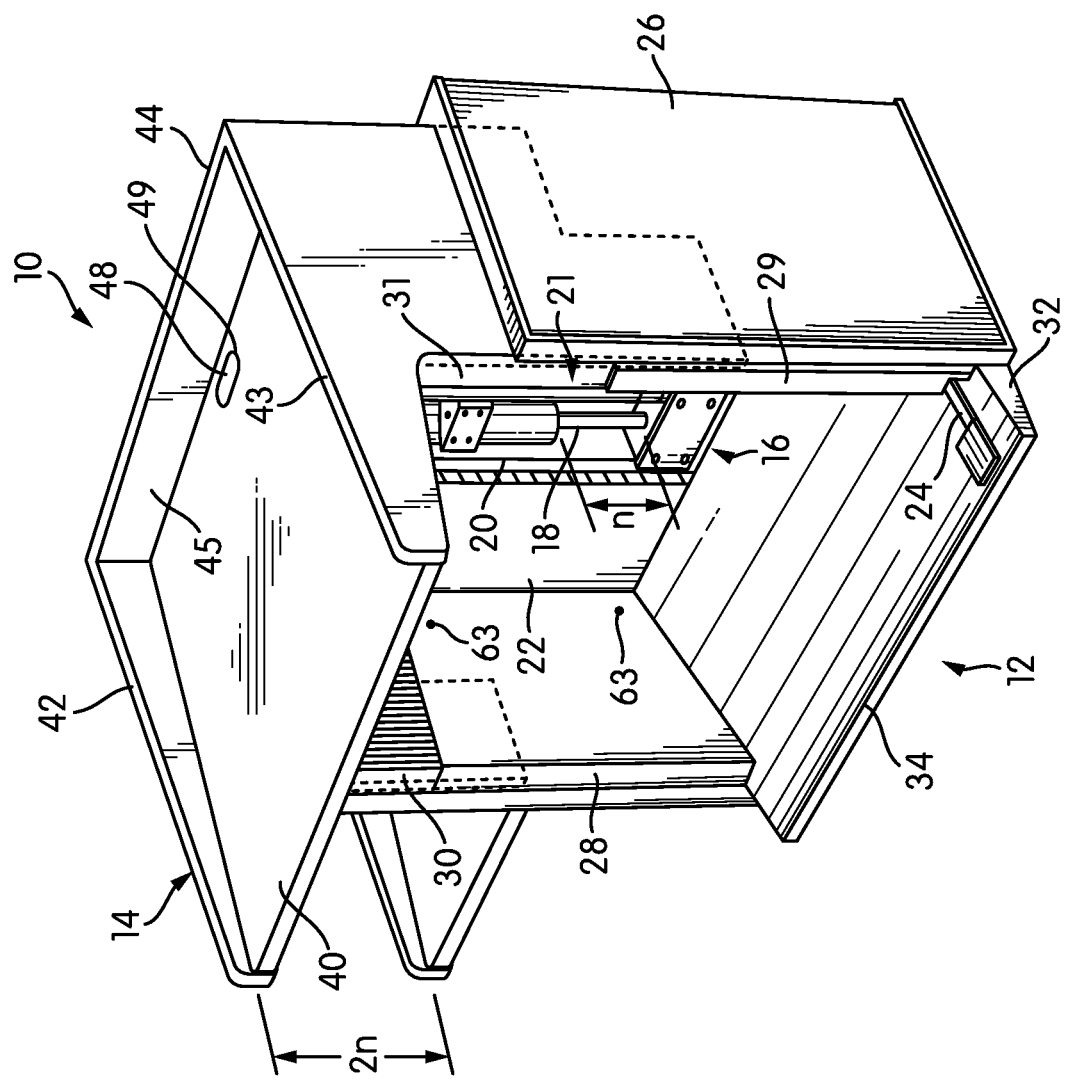
FIG. 3 illustrates an exemplary prior art desk with a gas spring actuated by a pedal.
Figure 4:
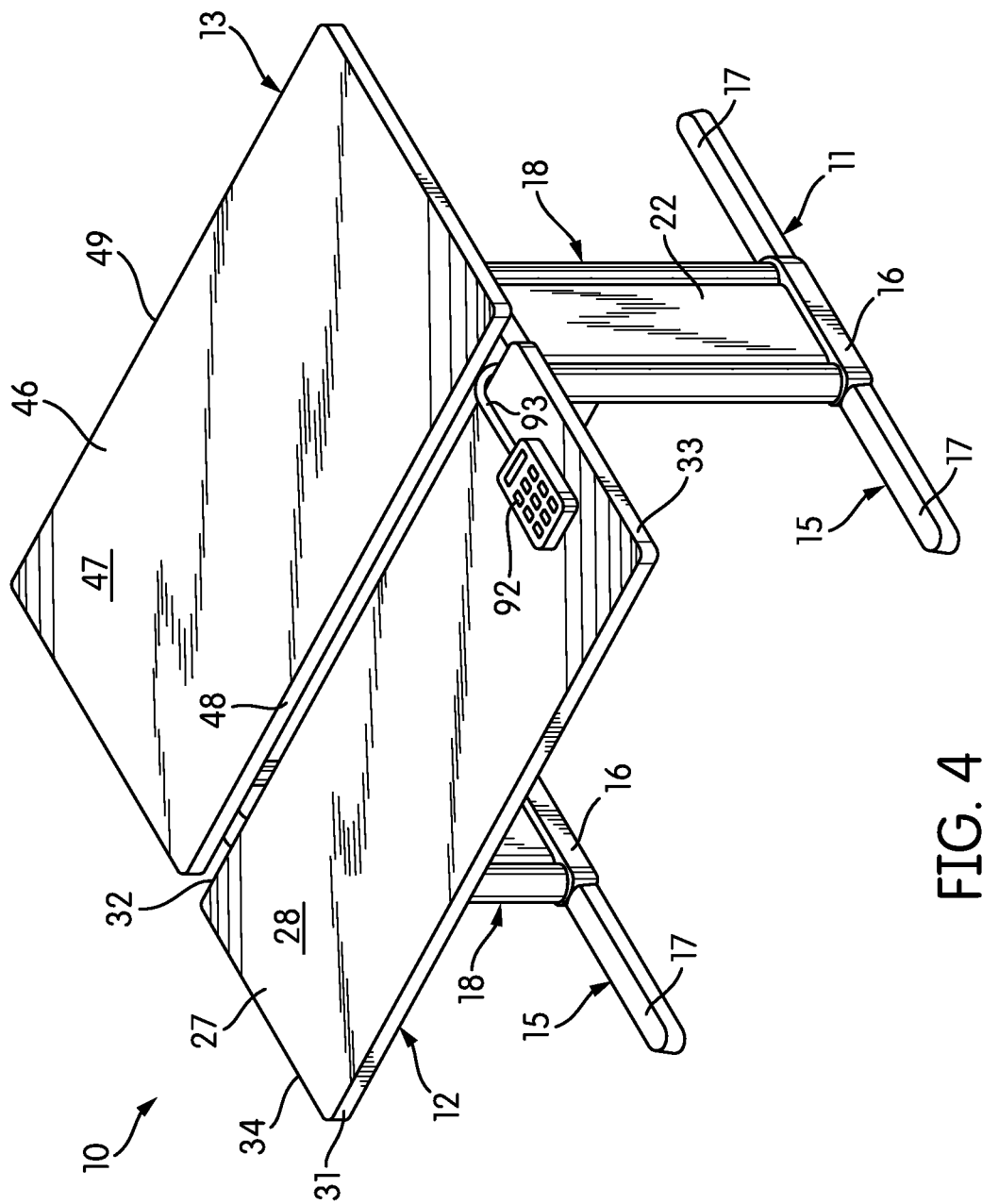
FIG. 4 illustrates an exemplary prior art work station with two working surfaces each having separate powered drives.
Figure 5:
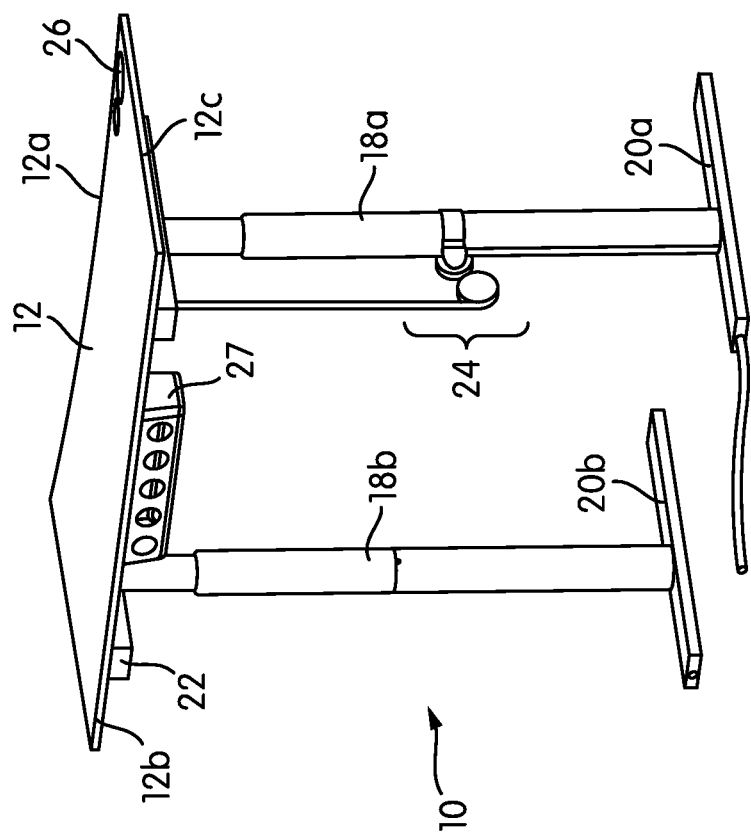
FIG. 5 illustrates an exemplary prior art sit/stand table with a power drive telescoping legs.

Devices which encourage a user to sit in a particular way, or to situate their hands while inputting by the use of a keyboard and a mouse or viewing a monitor in a prescribed way as to be considered healthier have been accepted and made available in the market for decades. In the most recent years there has been a rising concern regarding how sedentary the office worker has become and sitting at one's workstation for a prolonged time, even one considered an "ergonomic" work station might be harmful and/or considered as unhealthy.

This type of thinking has brought to the forefront certain products and devices specifically oriented to overcome the issue of sitting (with minimal movement) for prolonged periods of time in the work or office environment. These types of devices endeavor to lessen the sitting time of the typical office worker since sitting in standard chairs or even in chairs designed to be ergonomic for prolong periods of time has been determined to be unhealthy. A certain group of devices which allow an office worker to work optionally while sitting and while standing and alternate between the two have been typically called Sit/stands. Sit/stands typically are divided into two major categories, one being Sit/stand tables/desks where the entire working surface rises up and the other, Sit/stand desktop models where just a selected surface with enough area for standard input devices and the corresponding monitors, rise up with the user when they stand and work.

By encouraging an office worker who sits in a standard, stationary chair most of the day to stand up and move around and/or to stay standing for certain periods of time to work in a self-supported standing position, where the worker feels more alert, moves their body more and have a tendency to walk around more since they will be standing more for a greater portion of the day. These actions of standing, moving and walking around have been found to give the office worker a sense of wellbeing and it has been known to improve the office quality of life for those seeking a more proactive healthy working environment above and beyond what a standard task chair and desk can offer.

Even with these positive outcomes, these types of products function as they should only when the user engages them properly and uses them as suggested. If the user doesn't take care, they can over-use their devices by not taking proper breaks and/or the user could underutilize their devices making them useless and any potential gains not being realized due to the lack of use. Like exercising, typically there needs to be some sort of gradual and prolonged use of these types of devices for the operator to obtain any kind of benefit and for them to fully integrate the device into their daily work life as to allow them to obtain and realize the intended benefits of using such a device.

Through observation and research, the inventors of the present patent application have recognized the need for a variable height platform device, which senses the user's active engagement with the device's work surface in such a way as to aid or coach them in the process of integrating the sit/stand more readily into their office lifestyle. This is accomplished by sensing the user's active engagement with the device, by detecting user's movement through sensing zones, and the use of a controller and specialized firmware that are configured to help the operator to stand gradually and more often during their daily routine until the optimal daily recommended time is reached. The variable height platform device accomplishes this through the use of an arrangement of surface movement sensors which tracks a user's activity into and through certain sensor zones in such a way as to detect the operator's engagement and usage of the variable height platform device. This detection method allows for an accurate determination of activity and actual engagement with the variable height platform device versus just presence or proximity around the variable height platform device. This detection of actual activity and engagement gives a more accurate determination as to when the variable height platform device should signal to the operator when they should change their current state (e.g., when to stand and when to sit). The accurate sensing and tracking of the active engagement and the ability to compare the readings against the operator's activity preferences while taking into consideration the operator's experience curve will help to ensure the variable height platform device properly recommends when the operator should change states/positions. These recommendations can be determined by the following, or any combination of the following: sensor readings, position of the variable height platform, how much active time they have spent at certain positions as compared to the operators experience curve and their preference settings. This feature ensures that the users do not under-use or over-use the variable height platform device from the point they first use the variable height platform device to the point when they have become an experienced operator.

The variable height platform device can be configured as a motorized or manually operated variable height platform with corded or battery powered features and elements. If motorized, the variable height platform device can have the added benefit of automatically raising and lowering itself after it has given a visual and/or audio warning or indication that it is about to move. In another embodiment, the motorized version can sense that the operator is in such a position as to safely decide when to automatically raise or lower itself and to give the operator time to over-ride the automatic action. Optionally, the variable height platform device can be configured to only indicate by visual means (e.g., flashing LED) and audio means (e.g., speaker) when the user is within visual and/or audio indication range (e.g., within reach of the unit) and safely placed (i.e., in front of the unit with hands on or above the working surface) as to allow the variable height platform device to move automatically only when the operator is present and fully aware. This allows not only for safe operation, but also is a means to ensure that the variable height platform device changing its state is observed by the operator. Alternatively, the variable height platform device could indicate to the operator when it is the proper time to change orientation (height) as to indicate to the operator they should change position allowing the operator to indicate back to the variable height platform device through motion, user input or auditory means that the operator accepts the suggestion and actuates the variable height platform device to change its state. In this method, the operator is in total control and would give the input signal to the variable height platform device as to allow it to change versus the device automatically changing state.

In a non-motorized version, the variable height platform device would function similarly. For example, the variable height platform device could indicate to the operator when it is the proper time to change orientation (height) as to indicate to the operator they should change position. The operator manually changing the state of the platform would be considered as an input means by the variable height platform device and the variable height platform device signals to the controller/processor of the variable height platform device that the operator accepted the suggestion.

Small movements of the variable height platform device within the optimal standing or sitting height are advantageous to the operator since these small movements/changes, even if not observed by the operator, reduce the opportunity for exact repetitive movements to occur, which can strain the body. This feature of the variable height platform device would operate on the motorized version of the variable height platform device by observing the desired and confirmed upper (standing) and lower (sitting) positions for the variable height platform. These desired settings are placed into the variable height platform device's memory. Within these desired settings, the height of the variable height platform device would vary automatically and seemingly randomly within an acceptable range (e.g., two inches) by moving a quarter of an inch, then one inch, and then reversing itself one inch, and then quarter inch etc. This type of movement can be slowed as to make the operator unaware the variable height platform is actually changing its state so as to not interfere with the operator's daily task yet still aid the operator as intended by this feature.

In another embodiment of this feature, the variable height platform device could vary the height frequency and range of the variable height platform more aggressively as to encourage the operator to move themselves in larger ranges of movement (e.g., greater than two inches) and more frequently so as to purposely create a physical challenge for the more athletic operator. This type of purposeful movement would simulate a more advanced and challenging sets of movements which can exercise the body. These types of movements would give the operator the similar gains as a treadmill desk (desk which allows the operator to walk on the treadmill while working) without the danger, cost and the larger size and awkwardness associated with such devices. In the manually operated embodiment of this feature, the operator would be encouraged by the variable height platform device to manually move the variable height platform more often so as to gain the benefits which come from the more challenging constant and greater ranges of movements associated with this feature.

The present patent application makes improvements upon the current sit/stand devices and similar devices, but as we further describe and summarize the present patent application here, it will become apparent that some of the features and embodiments can be applied to other products and devices as previously listed, but not limited to keyboard managers, monitor stands, risers and desktop surfaces in general. The listed features and configurations described in the present patent application should not be considered as limiting in any way and it will become obvious from the described present patent application how the variable height platform device's features can be re-configured and applied to other platform devices that can benefit from the ability to sense and react to a given user's or operator's active movements. These and other numerous advantages of the present application will become apparent from the following feature descriptions and accompanying drawings.

Figure 6B:
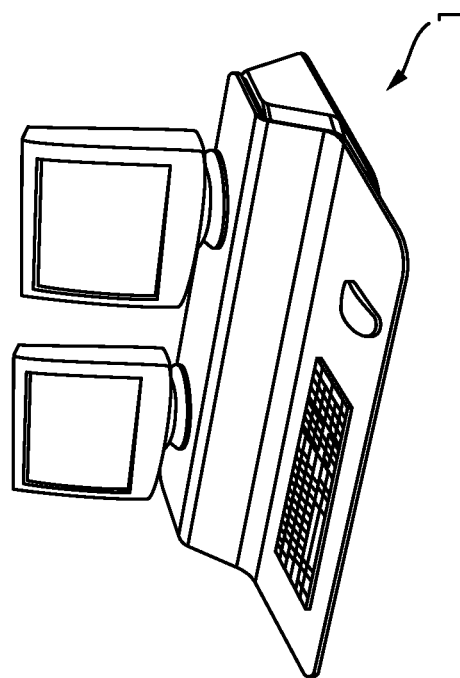
FIGS. 6A and 6B illustrate a variable height platform device in accordance with an embodiment of the present patent application.
Figure 6A:
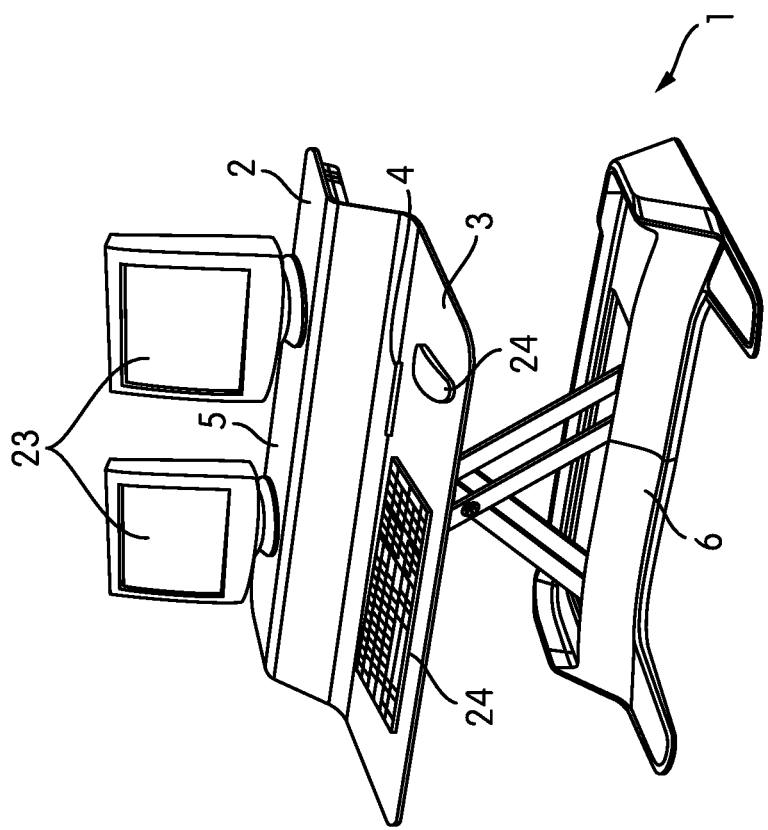

FIGS. 6A and 6B illustrate a variable height platform device 1 in accordance with an embodiment of the present patent application. The variable height platform device 1 is shown in the lowered configuration (in FIG. 6B) and is placed onto a desktop or standard height working platform. The variable height platform device 1 may be optionally secured with an anti-tipping device (now shown). An upper raised section of the platform device 1 is referred to as an upper platform 2 that may be optimized to improve the viewing angle of standard monitors similar to a monitor stand. The upper platform 2 may hold two standard monitors 23 that are secured to the surface with straps or adhesive hook and loop fasteners (not shown) with one half secured to the underside of the monitor stand and the other matching side secured to the upper platform 2 so as to ensure the monitor(s) are secured properly. Lower platform 3 is optimally configured to hold input devices 24, shown as a standard keyboard and mouse. If these are corded input devices, the cords of these devices and any other additional cords such as USB cords and phone charge cords may be routed through an opening 4. The transition from the upper platform 2 to the lower platform 3 may function as a cell phone or tablet holder. In the raised configuration, the lower platform 3 is set at a height that is optimal for the operator. On the motorized embodiment of the present patent application, the ideal raised and lowered settings are set into the memory so as to allow the variable height platform device 1 to move to these optimal set heights easily. A device housing 6 covers the base of the variable height platform device 1 that rests on the desktop or table surface by way of optional isolation feet (such as molded rubber feet). The device housing 6 covers a mechanical assembly which allows for either manual or motorized operation and is configured in such a way to keep the moving parts and the electronic components housed and protected. This same housing 6 may be designed to dampen and control the sound quality of the device when it is in motion.

Figure 7B:
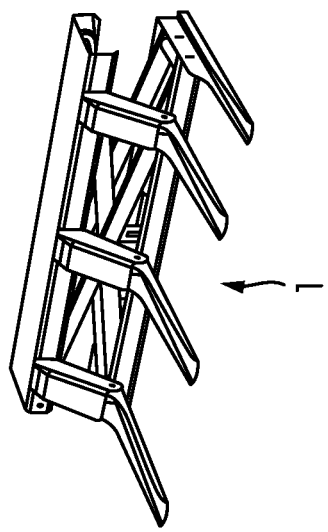
FIGS. 7A and 7B illustrate an undercarriage and mechanical systems of the variable height platform device of FIGS. 6A and 6B.
Figure 7A:
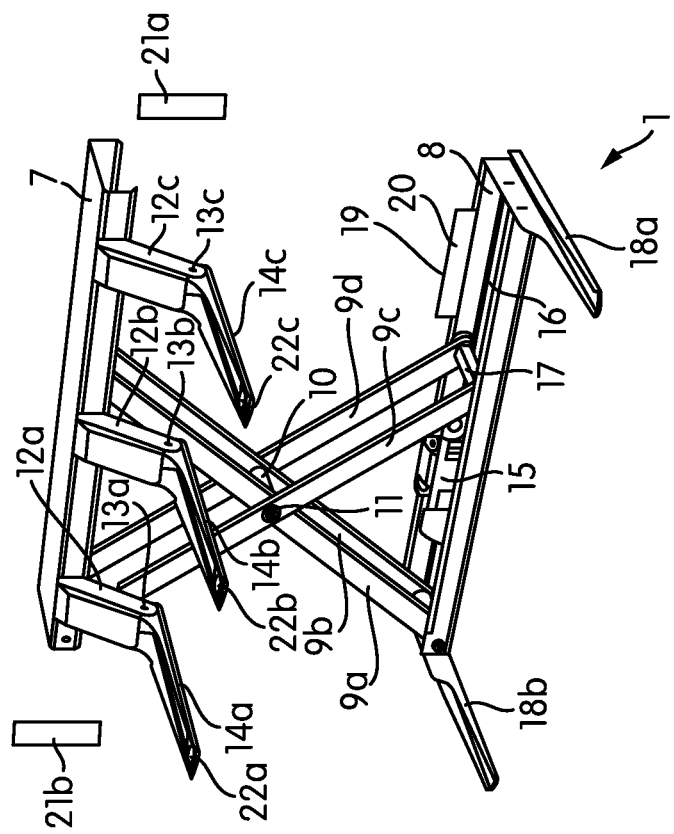

FIGS. 7A and 7B illustrate the undercarriage and mechanicals of the variable height platform device 1. FIG. 7B shows the device in its lowered configuration in which the operator would utilize in the sitting position. FIG. 7A shows the device in the raised configuration, the configuration in which the operator would utilize in the standing position.

Base stand legs 18a and 18b, and a lower guide frame 8 sit on the desk or table by way of isolation feet (not shown) and have been configured to be stable enough that the variable height platform device 1 may be initially set up without any additional clamps or supports. An anti-tipping cable or clamp (not shown) may be utilized to ensure the variable height platform device 1 doesn't accidentally tip over. The motorized embodiment of the variable height platform device 1 is powered by way of a power board 19, and a controller 20, reacting to inputs from control panels 21a and 21b, which send power and signals to a motor 15. The motor 15 is configured to rotate a drive screw 16 moving a screw guide 17 along the lower guide frame 8. The movement of the screw guide 17 draws the scissors legs 9a, 9b, 9c, and 9d assembled together by a spacer 10 and an assembly screw 11, closer together so as to move an upper guide frame 7 upwards and away from the lower guide frame 8.

An alternative manually operated embodiment, the scissors legs 9a, 9b, 9c, and 9d are configured to move in the lower guide frame 8 by way of a ratcheting mechanism (not shown) which would hold the lower platform 3 at the desired height. A release lever (not shown) may be configured to allow the scissors legs 9a, 9b, 9c, and 9d to be released and move freely again in the lower guide frame 8 by way of the ratcheting mechanism.

The lower platform 3 is assembled to support arm assemblies a, b and c (i.e., upper support arm assemblies 12a, 12b, and 12c, assembly hinge pin assemblies 13a, 13b, and 13c, and lower support arm assemblies 14a, 14b, and 14c). Support arms allow for the lower platform 3 to be constructed out of light rigid material in such a way that the lower platform 3 can be switched out easily to reconfigure the device to the operators specialized needs (such as a larger platform) or to fit within an office decor (e.g., shape, color or material). Active movement sensors 22a, 22b, and 22c create a sensor array or arrangement that is configured to detect an operator's movement on, across and above the lower platform 3.

Figure 8:
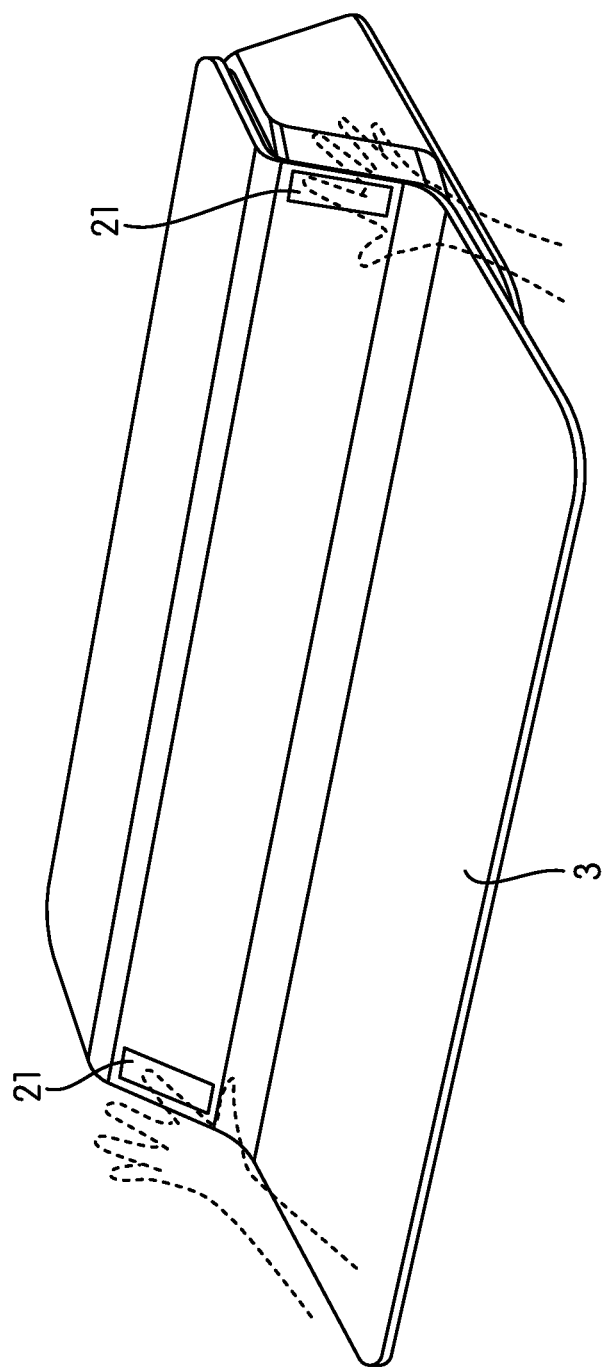
FIG. 8 illustrates a method in which an operator engages and controls the variable height platform device's functions in accordance with an embodiment of the present patent application.

FIG. 8 illustrates a method in which an operator engages and controls the variable height platform device's functions in accordance with an embodiment of the present patent application. Two hands of the operator operating control panels 21 in the method as shown ensures intentional engagement since both hands of the operator would have to be within a tolerance zone of the control panel 21 so as to signal to the variable height platform device a positive and intentional controlling motions have been made to activate the variable height platform device to raise or lower the variable height platform. In this way, there is no confusion as the variable height platform device detects movements of the operator as they interact with the input devices (such as keyboards and computer mice) residing on the lower platform 3. In an alternative embodiment, a single hand of the operator could operate the control panel 21 and the variable height platform device 1 by making direct contact onto the surface of either of the control panels 21.

Figure 9:
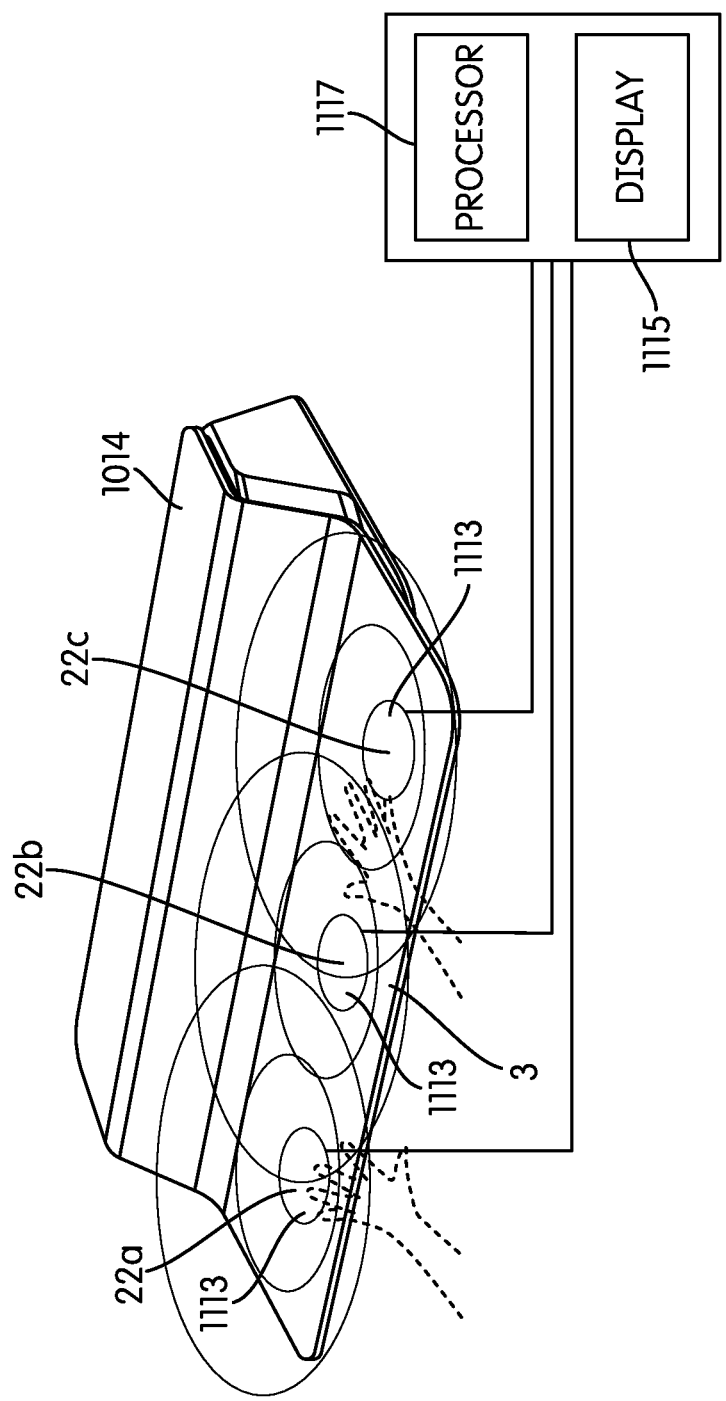
FIG. 9 illustrates an active movement sensor arrangement of the variable height platform device in accordance with an embodiment of the present patent application.

FIG. 9 illustrates an active movement sensor arrangement in accordance with an embodiment of the present patent application. Operator sensing active movement sensors 22a, 22b, and 22c are configured to create sensing/sensor zones which can detect movement on, above and around the lower platform 3. These zones when overlapped have varied sensitivity and as a hand of the operator moves around and through these zones, varied signals levels are detected and transmitted to the controller. In one embodiment, the actions of keying on a keyboard, moving an input device such as a mouse, even writing on the surface of the lower platform 3 are be detected and registered as active movement and engagement with the variable height platform device. The detection of movement (and not just the presence of a person/an operator near the variable height platform device) ensures that the variable height platform device only credits active usage vs. a resting state or a person/an operator being simply near the variable height platform device and not engaging it as intended.

This arrangement of sensors allows for a higher resolution and recognition of certain intentional movements which may be used to signal and activate a predetermined action. For example, both hands moving forward over the surface signals the controller to make the variable height platform device rise and alternatively, both hands moving backwards over the surface of the lower platform 3, signals the controller to make the variable height platform device lower itself.

This arrangement in such a device is also able to detect the presence of certain products which have been given key resistive or capacitance values. For example, a keyboard wrist rest would give out a passive resistive or capacitive signal of a specific value. When the keyboard wrist rest is placed upon the lower platform 3, the active movement sensors 22a, 22b, and 22c are configured to detect the specific resistive or capacitive value and signal the presence of the wrist rest to the device's controller. It is well known that using ergonomic accessories such as a wrist rest (not shown) allows the operator to do a given task like keyboarding in an ergonomically healthier way and the controller would then allow the person to get so called ergonomic credit for having and using such a device. Starting with a higher ergonomic value would allow the person/operator to work at a specific task longer and the controller detecting the presence of the wrist rest by way of the active movement sensors 22a, 22b, and 22c would then alter the timing sequences accordingly. The more specialized ergonomic devices used by the operator, the longer they are allowed to work in a given state as compared to the time when not using such a device. This present application uniquely senses and recognizes these configurations and devices as to react properly and uniquely through the controller and a sequence of predetermined actions then may be activated by the controller.

Figure 10:
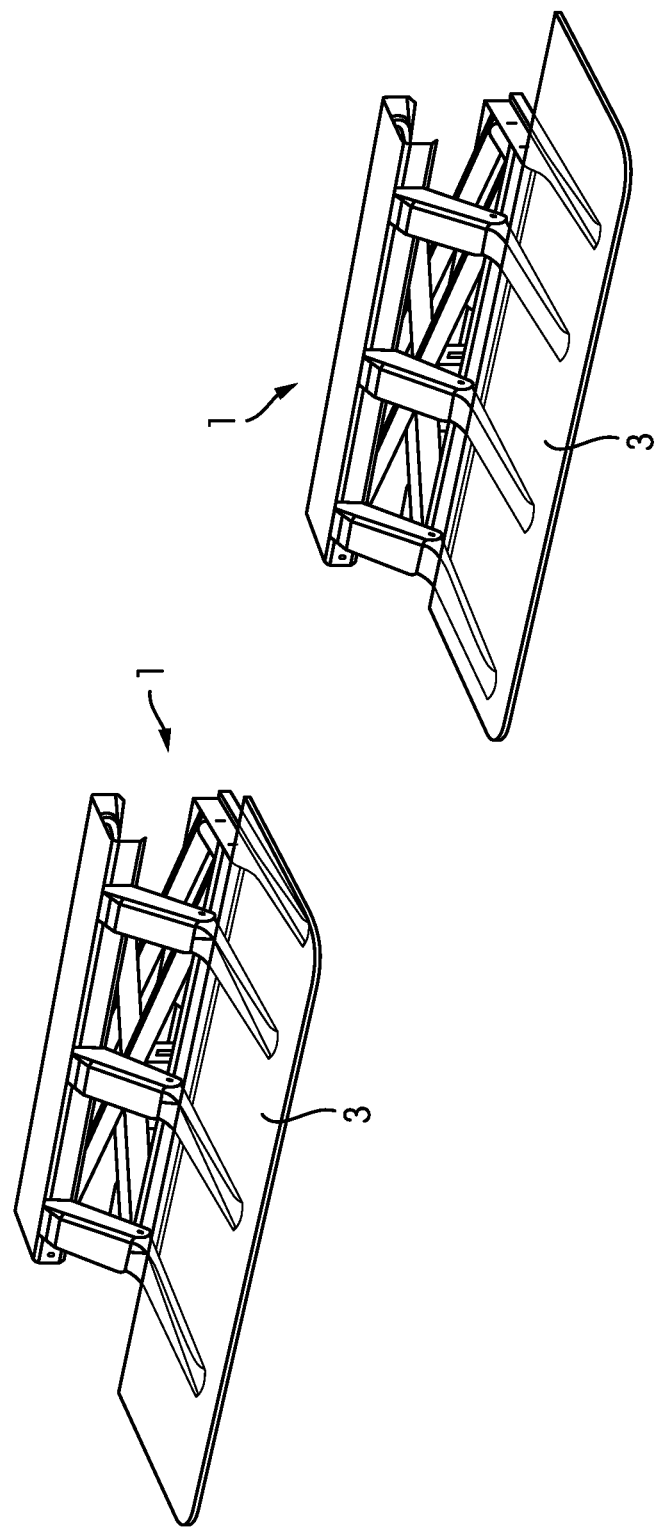
FIG. 10 illustrates how the lower platform of the variable height platform device may be replaced, moved or justified right or left upon support arm assemblies in accordance with an embodiment of the present patent application.

FIG. 10 illustrates how the lower platform 3 may be replaced, moved or justified right or left upon the support arm assemblies in accordance with an embodiment of the present patent application. Since the support arm assemblies support the lower platform 3, the lower platform 3 may be constructed out of thinner material which allows the variable height platform device to rest on the surface (that it rests upon) with a possible lowest step (i.e., basically the thickness of the material) on the leading edge of the variable height platform device 1.

Figure 11:
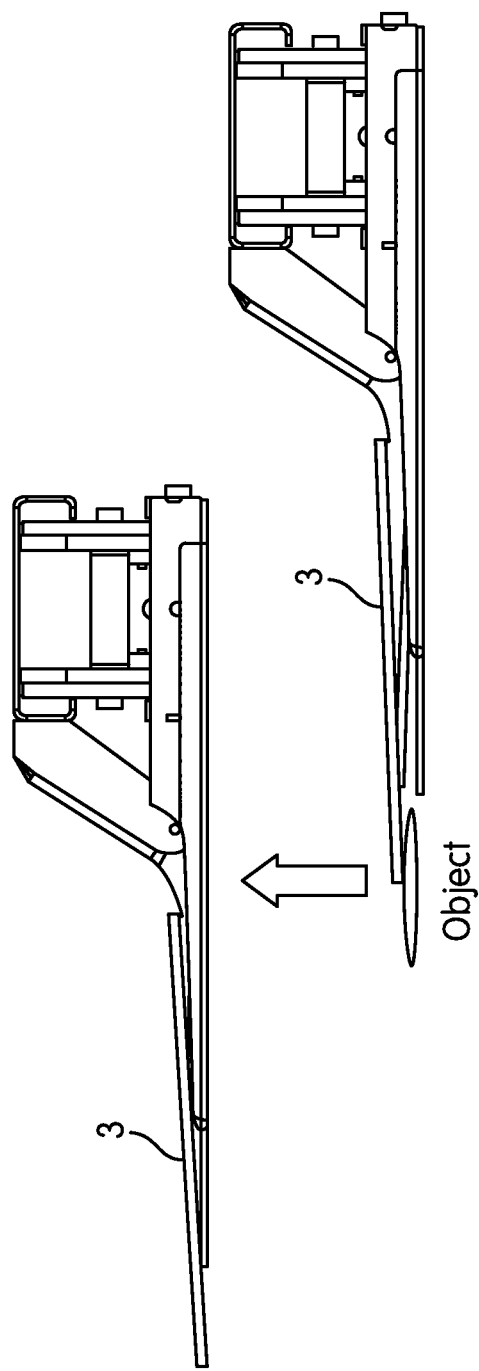
FIG. 11 illustrates a feature in which the lower platform of the variable height platform device articulates upwards by way of a lower support arm pivoting at the connection with an upper support arm in accordance with an embodiment of the present patent application.

FIG. 11 illustrates a safety feature in which the lower platform 3 articulates upwards by way of the lower support arm 14 pivoting at the connection with the upper support arm 12 in accordance with an embodiment of the present patent application. This upward pivot occurs if an object (shown) prevents the variable height platform device from being lowered fully which in turn actuates a safety switch that signals to the controller that the variable height platform device must stop. In one embodiment, the variable height platform device stops and slightly reverses so as to relieve any possible stress the variable height platform device has placed onto the object as it attempted to lower itself.

Figure 12:
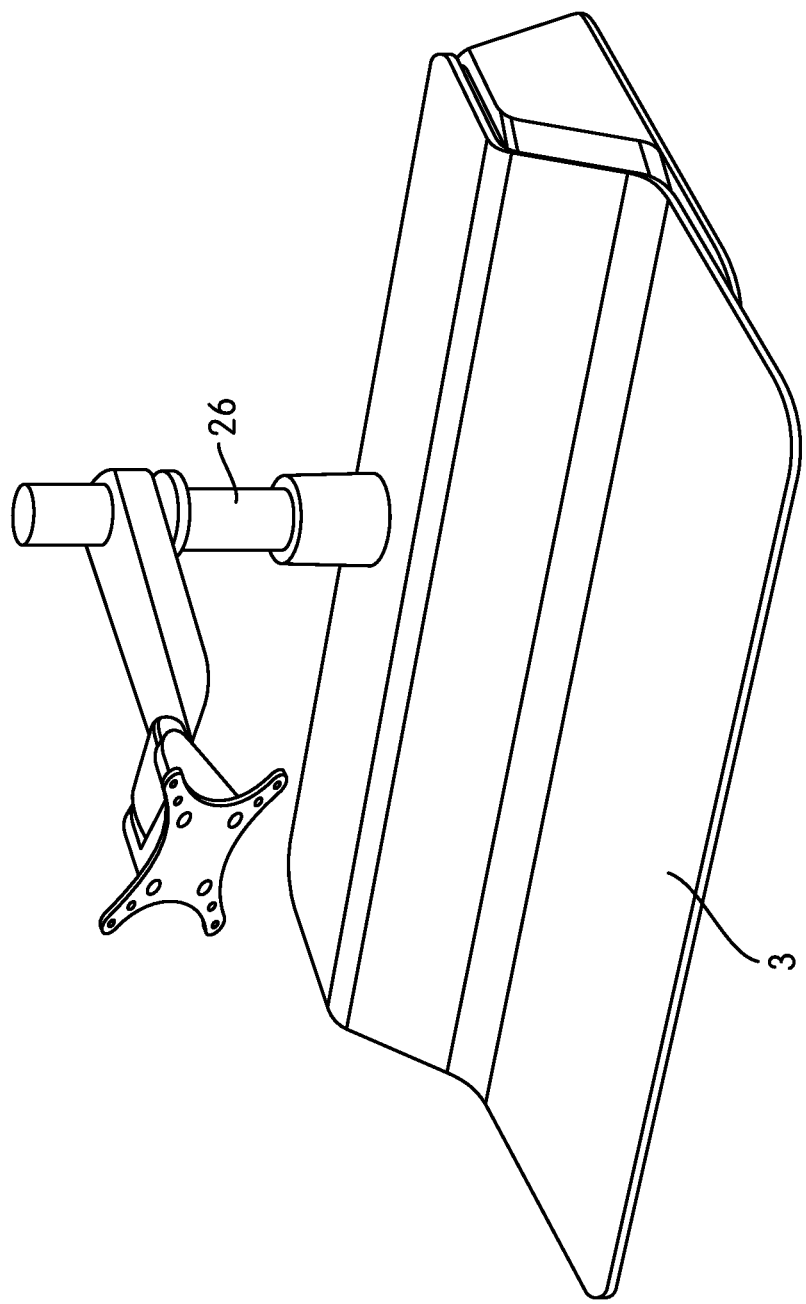
FIG. 12 illustrates the variable height platform device in the lowered position with the lower platform's leading edge resting on the surface of the desk or table top surface with a mounted monitor arm assembled onto the variable height platform device in accordance with an embodiment of the present patent application.

FIG. 12 illustrates the variable height platform device 1 in the lowered position with the lower platform 3 leading edge resting on the surface of the desk or table top surface with a mounted monitor arm 26 assembled onto the variable height platform device 1.

Figure 13:
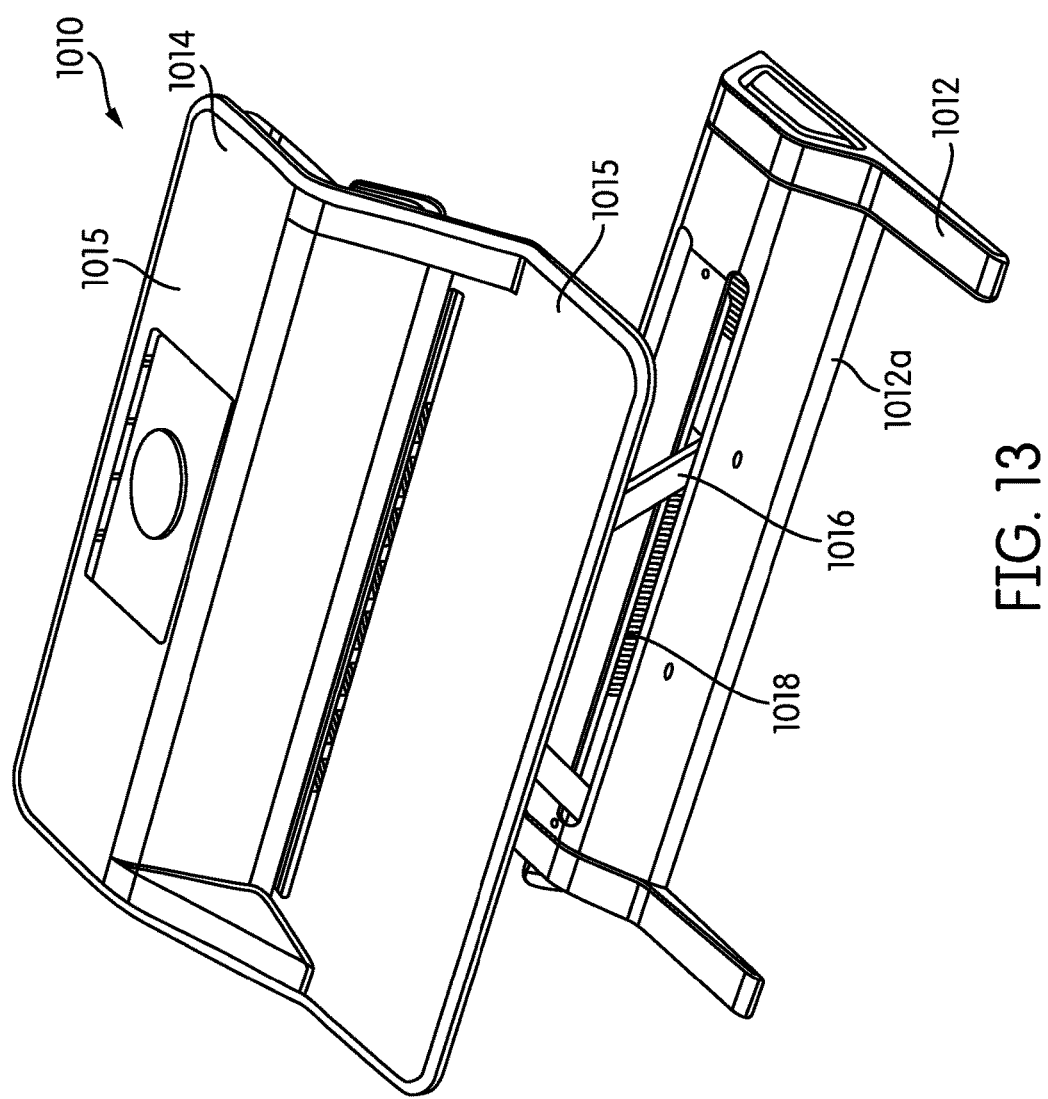
FIG. 13 illustrates a variable height desktop workstation system in accordance with another embodiment of the present patent application, wherein the variable height platform is in a fully raised position.
Figure 14:
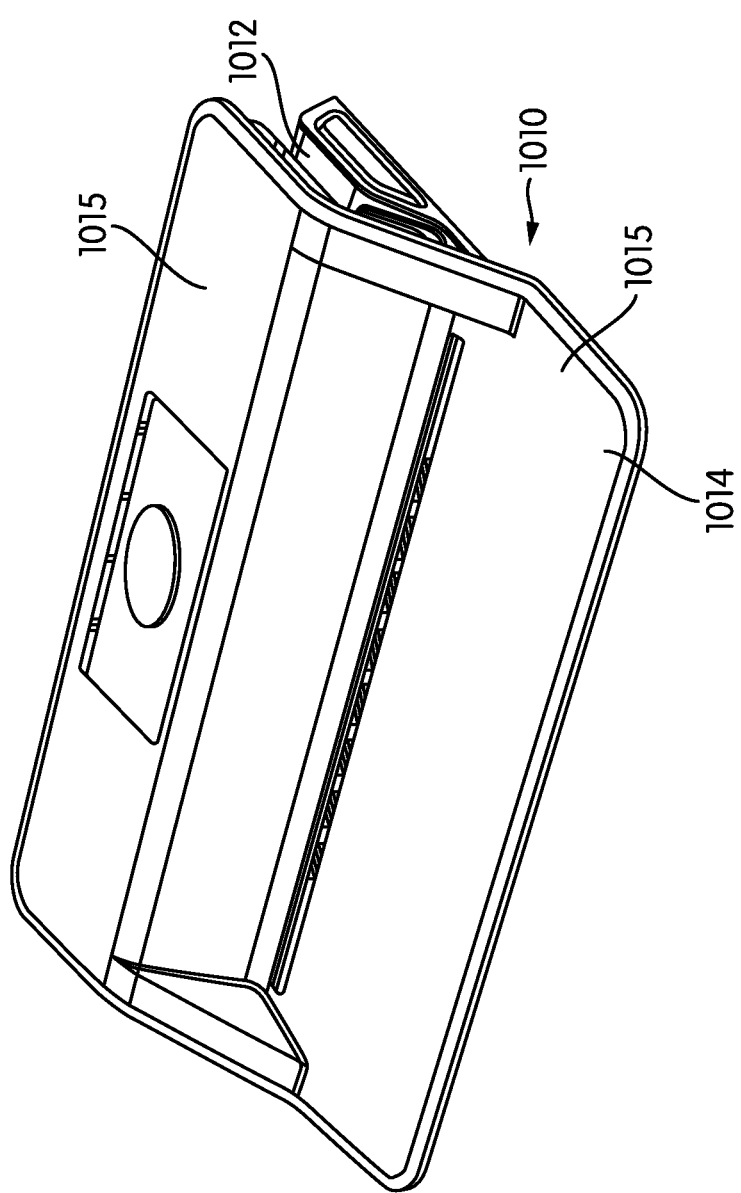
FIG. 14 illustrates the variable height desktop workstation system of FIG. 13, wherein the variable height platform is in a fully lowered position.

FIGS. 13 and 14 illustrate a variable height desktop workstation system 1010 in accordance with another embodiment of the present patent application. In one embodiment, the variable height desktop workstation system 1010 includes a base 1012, a variable height platform 1014, a lift mechanism 1016, and a secondary force assist device 1018.

Figure 16:
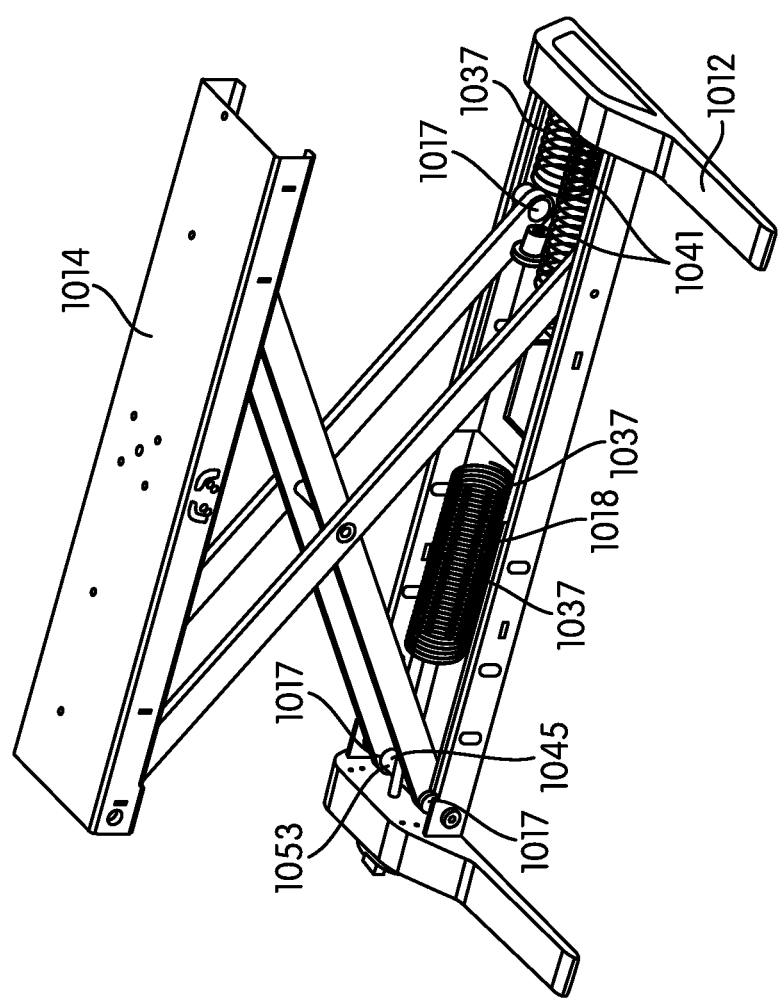
FIG. 16 illustrates a perspective, front view of the variable height desktop workstation system of FIG. 13, where some portions of the variable height desktop workstation system are not shown for sake of clarity and to better illustrate other components of the variable height desktop workstation system.

In one embodiment, the variable height desktop workstation system 1010 is configured to be positionable on a surface (e.g., desktop). The base 1012 may be configured to engage the surface and support the variable height desktop workstation system 1010 on the surface. The base 1012 may include a base housing 1012a that is configured to receive and enclose/cover end portions 1017 (as shown in FIG. 16) of the lift assembly 1016 and portions of the secondary force assist device 1018.

The base 1012 may be configured to prevent scratching of the support surface, or increase friction on the support surface to prevent shifting or sliding of the variable height desktop workstation system 1010 while in use. The base 1012 may include leveling caps provided thereon that are configured to enable the variable height desktop workstation system 1010 be placed firmly on the surface without rocking. The leveling caps may be adjusted or turned until the rocking motion of the variable height desktop workstation system 1010 on the surface is eliminated. The leveling caps may be configured to compensate for any unevenness of the surface and/or any misalignment of the members of the lift assembly 1016.

In one embodiment, the structure and configuration of the base 1012 may be similar to those of the device housing 6 that is shown in and described with respect to FIGS. 6A and 6B of the present patent application. In another embodiment, the structure and configuration of the base 1012 may be similar to those of the base stand legs 18a and 18b, and the lower guide frame 8 that are shown in and described with respect to FIGS. 7A and 7B of the present patent application.

In one embodiment, the base 1012 and/or the lift mechanism 1016 may be made of a metal material. For example, the base 1012 and/or the lift mechanism 1016 may be made of a steel material or an aluminum material. In one embodiment, the base 1012 and/or the lift mechanism 1016 may be made of any other suitable material or combination of materials having sufficient durability to permit the user use the variable height desktop workstation system 1010 while maintaining structural stability of the variable height desktop workstation system 1010.

The variable height platform 1014 may include upper and lower platforms or work surfaces 1015. In one embodiment, the structure, operation and configuration of the variable height platform 1014 are similar to those of the upper and lower platforms 2 and 3 that are shown in and described with respect to FIGS. 7A and 7B of the present patent application and are, therefore, not described in detail here. The work surfaces 1015 may also be configured to receive user's documents thereon.

Figure 21:
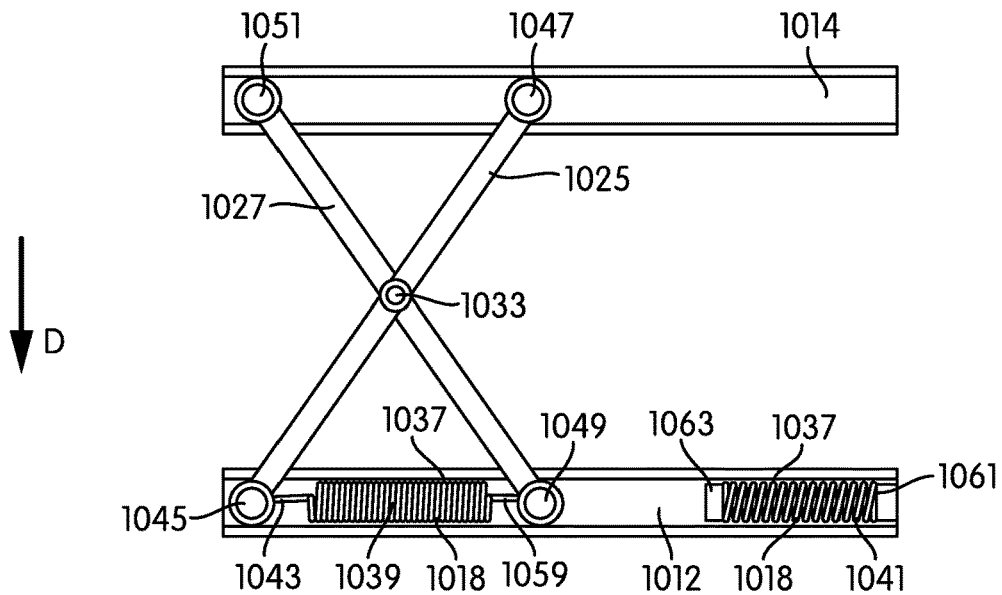
FIG. 21 illustrates a rear elevational view of the variable height desktop workstation system in accordance with an embodiment of the present patent application, where the variable height platform is in a fully raised position and where some portions of the variable height desktop workstation system are not shown for sake of clarity and to better illustrate other components of the variable height desktop workstation system.
Figure 22:
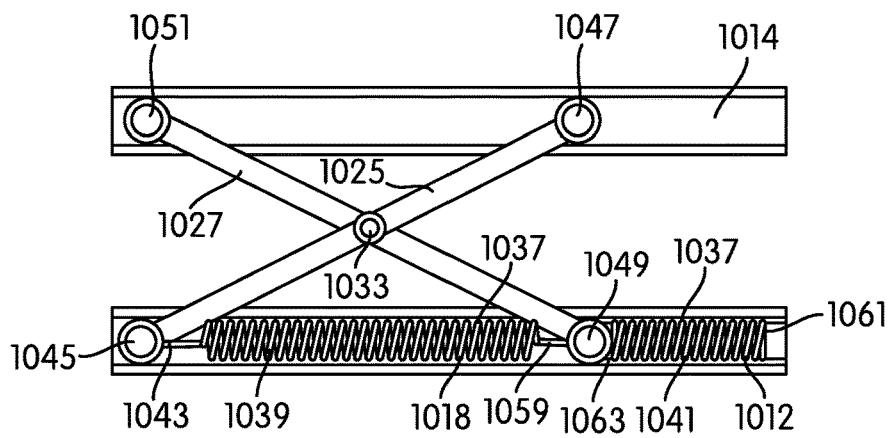
FIG. 22 illustrates another rear elevational view of the variable height desktop workstation system, where the variable height platform is in an intermediate position between the fully raised position and a fully lowered position, and where some portions of the variable height desktop workstation system are not shown for sake of clarity and to better illustrate other components of the variable height desktop workstation system.
Figure 23:
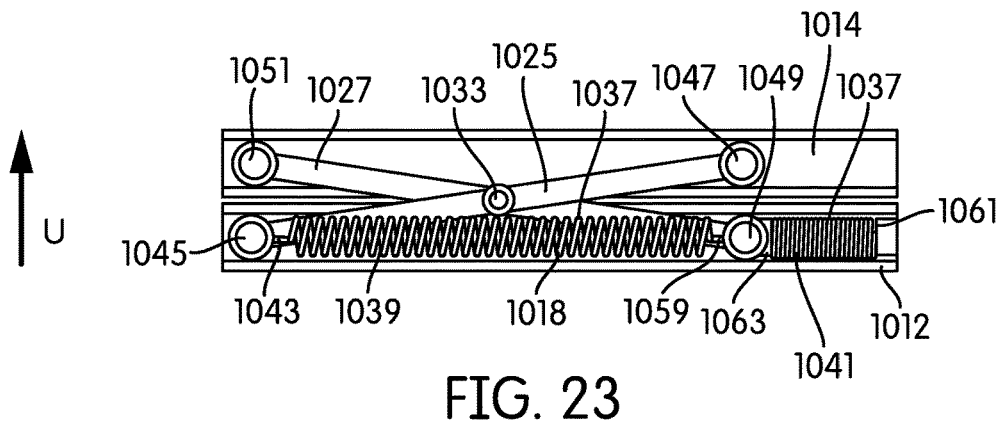
FIG. 23 illustrates yet another rear elevational view of the variable height desktop workstation system, where the variable height platform is in the fully lowered position and where some portions of the variable height desktop workstation system are not shown for sake of clarity and to better illustrate other components of the variable height platform workstation system.
Figure 24:
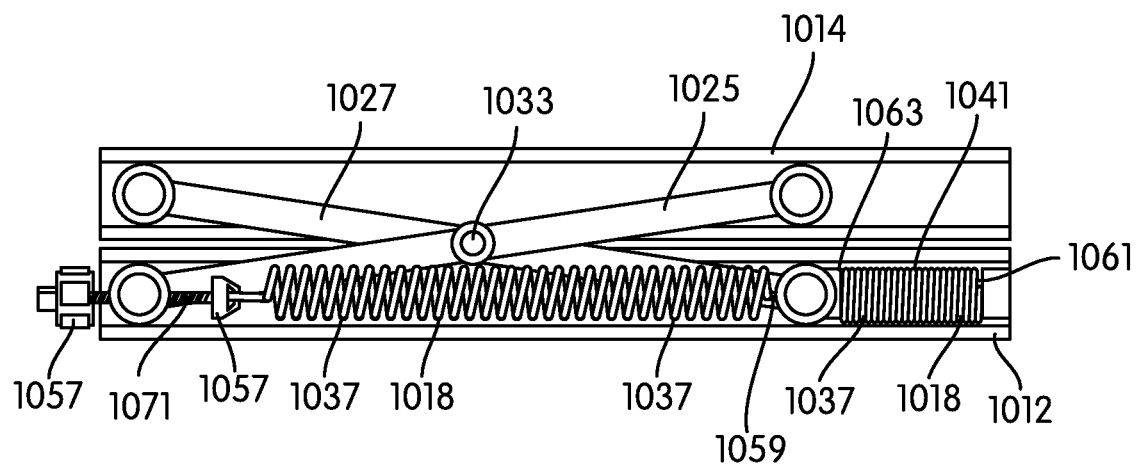
FIG. 24 illustrates a variable height desktop workstation system with a variable force spring assist mechanism in accordance with an embodiment of the present patent application.

The lift mechanism 1016 is configured to move the variable height platform 1014 within a range of motion between a fully lowered position (as shown in FIGS. 14, 23 and 24) and a raised position (as shown in FIGS. 13, 15, 16, 21, 22 and 25). In one embodiment, the raised position may be a fully raised position as shown in FIGS. 13 and 21. In one embodiment, the raised position may be an intermediate position between the fully lowered position and the fully raised position. The variable height platform 1014 may include one or more intermediate positions between the fully raised position of FIG. 13 and the fully lowered position of FIG. 14. For example, a few of the intermediate positions of the variable height platform 1014 are shown in FIGS. 15, 16, 22 and 25.

In one embodiment, the lift mechanism 1016 is a scissors lift mechanism. The lift mechanism 1016 may include a plurality of articulated or leg members 1021, 1023, 1025, and 1027. In the illustrated embodiment, the articulated members 1021 and 1023 form leg assembly 1029 and the articulated members 1025 and 1027 form leg assembly 1031. A pivot pin/connection 1033 is configured to pivotally connect the articulated member 1021 and the articulated member 1023, pivotally connect the articulated member 1025 and the articulated member 1027, and connect the leg assembly 1029 with the leg assembly 1031. In one embodiment, the number of articulated members and the number of leg assemblies may vary.

Figure 15:
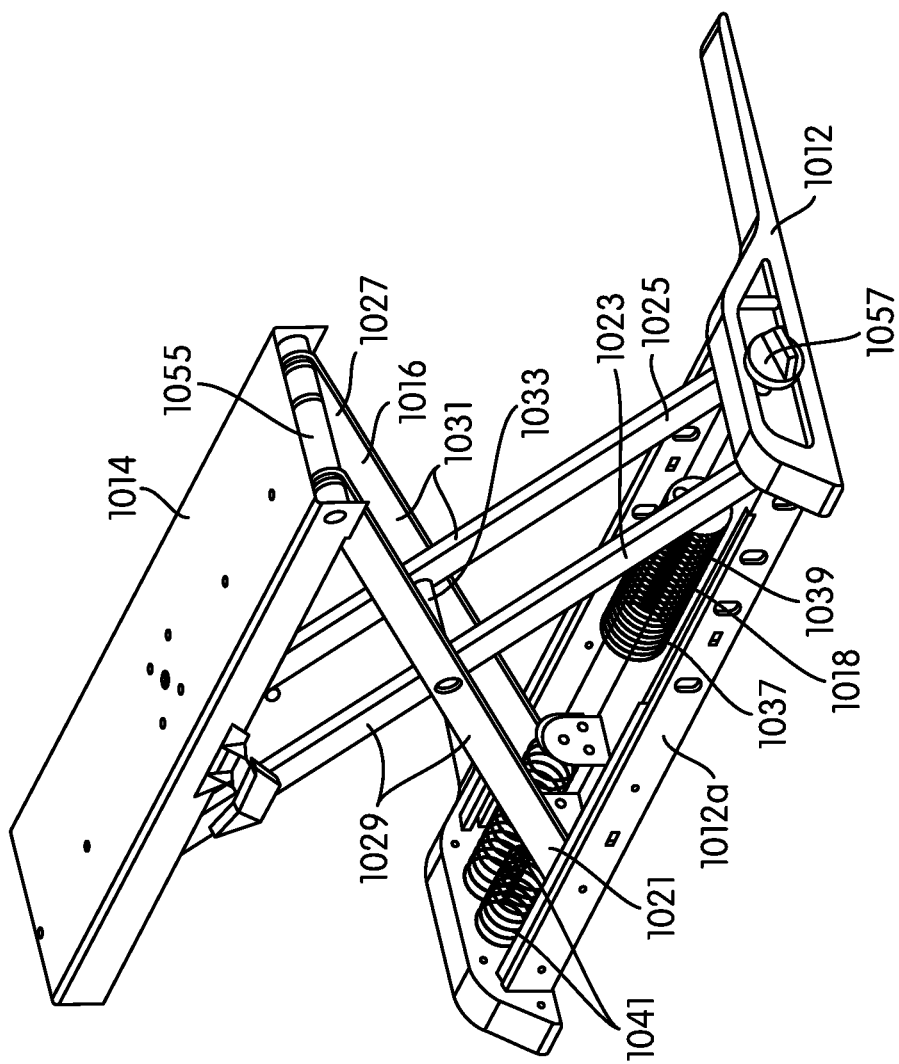
FIG. 15 illustrates a perspective, rear view of the variable height desktop workstation system of FIG. 13, where some portions of the variable height desktop workstation system are not shown for sake of clarity and to better illustrate other components of the variable height desktop workstation system.
Figure 17:
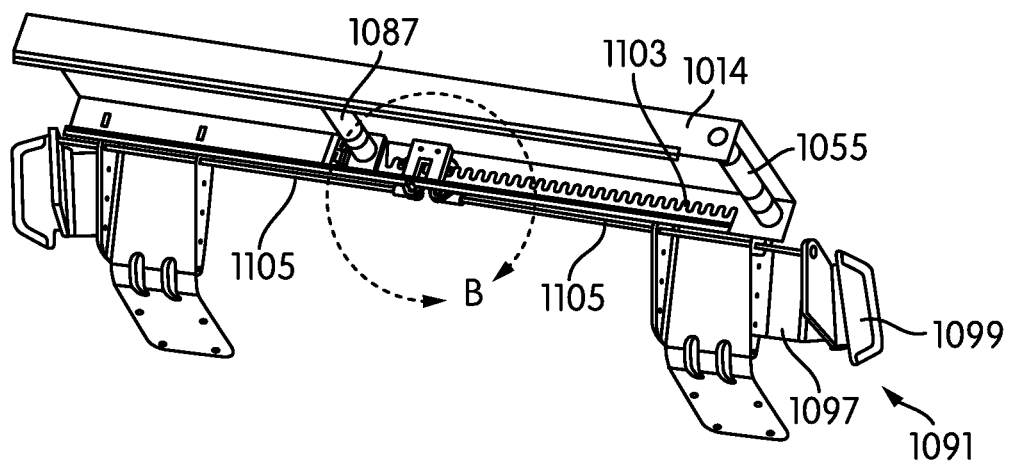
FIG. 17 illustrates a perspective, bottom view of the variable height platform of the variable height desktop workstation system of FIG. 13.
Figure 18:
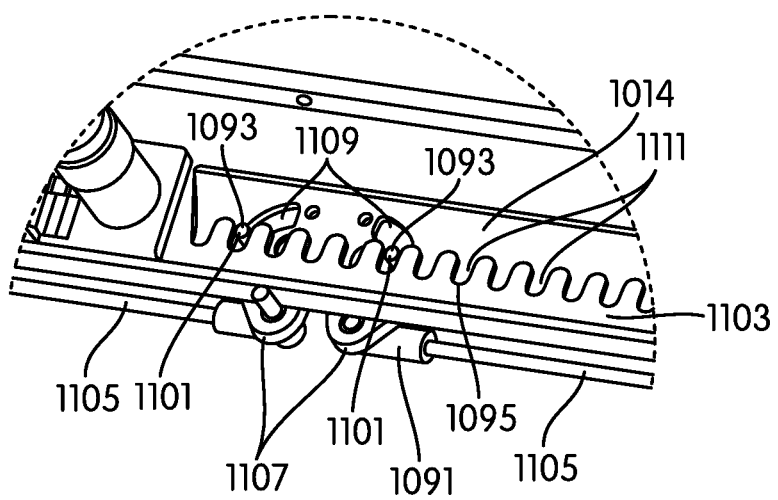
FIG. 18 illustrates a detailed view of portion B in FIG. 17.
Figure 19:
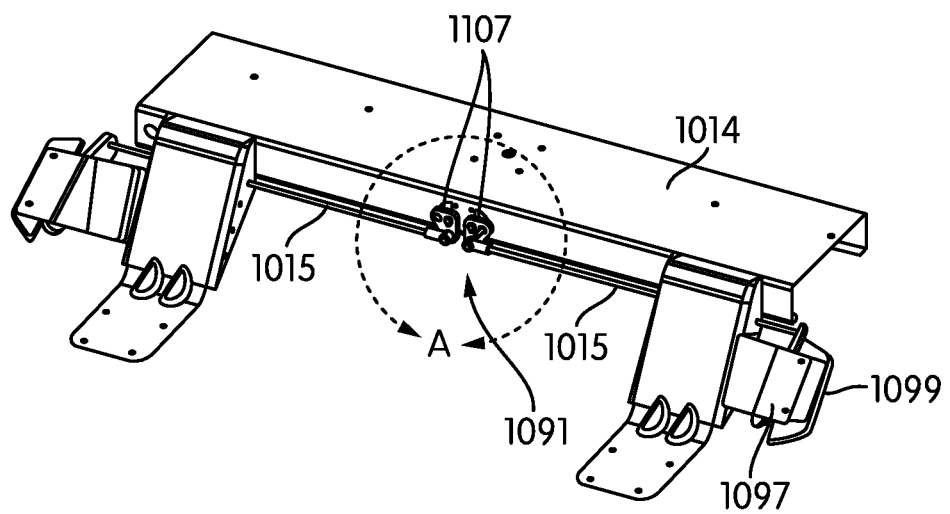
FIG. 19 illustrates a perspective, front view of the variable height platform of the variable height desktop workstation system of FIG. 13.
Figure 20:
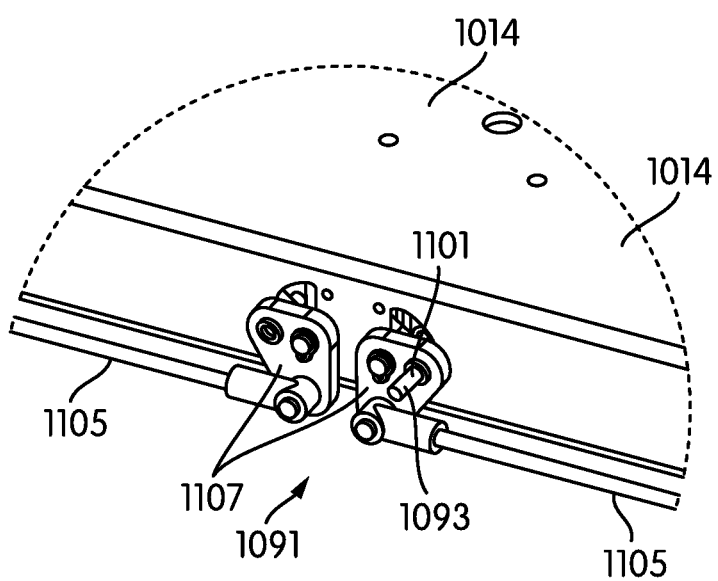
FIG. 20 illustrates a detailed view of portion A in FIG. 19.

In one embodiment, one end portion of each leg member of the lift assembly 1016 is connected to the base 1012 and the other end portion of each leg member of the lift assembly 1016 is connected to the variable height platform 1014. For example, referring to FIGS. 21-23, end portions 1047 of the articulated members 1023, 1025 are connected to each other using a pin member 1087 (as shown in FIGS. 17 and 18) and are together movably/slidably connected to portions of the variable height platform 1014. End portions 1049 of the articulated members 1021, 1027 are connected to each other using a pin member and are together slidably/movably connected to the base 1012. End portions 1045 of the articulated members 1023 and 1025 are connected to each other using a pin member 1053 (as shown in FIG. 16) and are fixedly connected to the base 1012. End portions 1051 of articulated members 1021 and 1027 are connected to each other using a pin member 1055 (as shown in FIG. 15) and are fixedly connected to portions of the variable height platform 1014.

Figure 25:
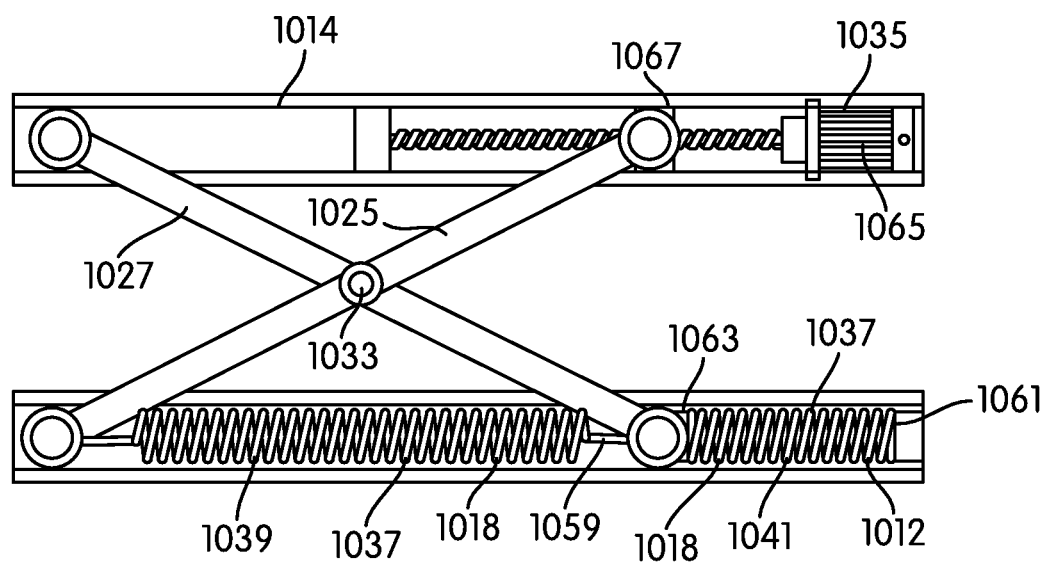
FIG. 25 illustrates a variable height desktop workstation system with a motor and a spring assist mechanism in accordance with an embodiment of the present patent application.

In one embodiment, as shown in FIG. 25, the variable height desktop workstation system 1010 includes a prime mover 1035 configured to provide a force to the lift mechanism 1016 directed to the variable height platform 1014 in an upward direction (as shown in arrow U in FIG. 23) from the fully lowered position towards the raised position in both the upper and lower parts of the range of motion. The prime mover 1035 may be selected from the group consisting of a manual arrangement, a motor arrangement, a pneumatic arrangement, and a hydraulic arrangement.

In one embodiment, as shown in FIG. 25, the prime mover 1035 is a motor arrangement 1065. In one embodiment, the motor arrangement 1065 is configured to be operatively connected to a portion 1067 of the lift mechanism 1016. In one embodiment, as shown in FIG. 25, a clutch mechanism or a force limiter in combination with the variable spring assist device is configured to allow the variable height desktop workstation system 1010 to be adjusted from no assist, partially assisted to fully automatic by the user's preference. In one embodiment, the variable height desktop workstation system 1010 having the motor 1065 illustrates a motor assist mode where the motor 1065 and optionally in combination with spring (with and without the adjustability) assist the user lift and lower the variable height platform 1014.

The secondary force assist device 1018 is configured to provide an additional force to the lift mechanism 1016 directed to the variable height platform 1014 in the upward direction (as shown by an arrow U in FIG. 23) from the fully lowered position towards the raised position only in the lower part of the range of motion so as to compensate for the lower raising force leverage of the lift mechanism 1016.

The secondary force assist device 1018 may be selected from the group consisting of a pneumatic assist arrangement, a hydraulic assist arrangement, a spring assist arrangement, a variable or an adjustable force spring assist arrangement, and an adjustable force sensing motor assist arrangement. That is, the secondary force assist device 1018 is configured to assist the prime mover 1035.

In one embodiment, the secondary force assist device 1018 includes a spring arrangement 1037. The spring arrangement 1037 includes an extension spring member 1039 and at least one compression spring member 1041. The number of spring members (extension or compression spring members) in the spring arrangement of the secondary force assist device 1018 may vary. The number of compression spring members in the spring arrangement of the secondary force assist device 1018 may also vary.

In one embodiment, the lift mechanism 1016 has a lower raising force leverage in a lower part of the range of motion and a higher raising force leverage in an upper part of the range of motion. The upper part of the range of motion may include the range of motions where the lift mechanism 1016 is disengaged from the at least one compression spring member 1041 and the additional force to the lift mechanism 1016 is provided by the extension spring member 1039. The lower part of the range of motion may include the range of motions where the lift mechanism 1016 is engaged with the at least one compression spring member 1041 and the additional force to the lift mechanism 1016 is provided by both the extension spring member 1039 and the at least one compression spring member 1041.

In one embodiment, one end portion of the extension spring member 1039 is connected to a portion of the lift mechanism 1016 and the other end portion of the extension spring member 1039 is connected to a portion of the base 1012. For example, in one embodiment, one end portion 1043 of the extension spring member 1039 is stationary and fixedly connected to the base 1012 and/or the end portions 1045 of the articulated members 1023 and 1025. In another embodiment, the end portion 1043 of the extension spring member 1039 is adjustable and is connected to a portion of a variable force spring tensioner arrangement 1057 (as shown in FIGS. 15 and 24). In this embodiment, the variable force spring tensioner arrangement 1057 also acts as the secondary force assist device 1018. Other end portion 1059 of the extension spring member 1039 is connected with the slidable/movable end portions 1049 of the articulated members 1021, 1027.

Referring to FIGS. 15 and 24, the variable force spring tensioner arrangement 1057 is configured to rotate a threaded rod 1071 which in turn loosens or tightens (i.e., depending on thread direction and the direction of rotation) the tension level (or force range) of the extension spring member 1039. This configuration allows the control force needed to move the variable height platform 1014 to be adjusted for ease of use (e.g., raising and lowering). This configuration also allows the control force needed to move the variable height platform 1014 to be adjusted to balance or compensate for objects being placed onto the variable height platform 1014 (such as computer keyboards, laptops, monitors etc.). That is, the variable force spring tensioner arrangement 1057 is configured to adjust force needed to move variable height platform 1014 up and down and to counter any additional weight added to the variable height platform 1014, such as a computer monitor.

The at least one compression spring member 1041 of the secondary force assist device 1018 is configured to provide the additional force to the lift mechanism 1016 directed to the variable height platform 1014 in the upward direction (as shown by the arrow U in FIG. 23) only in the lower part of the range of motion to reduce the force required to lift the variable height platform 1014 from the fully lowered position to the raised position. The at least one compression spring member 1041 is configured to add additional force when raising the variable height platform 1014. The at least one compression spring member 1041 is configured to compensate for non-linear force translation by the scissors lift mechanism 1016.

In one embodiment, one end portion of the at least one compression spring member 1041 is connected to a portion of the base 1012 and the other end position of the at least one compression spring member 1041 is configured to engage with a portion of the lift mechanism 1016 to provide the additional force to the lift mechanism 1016. For example, referring to FIGS. 21-25, one end portion 1061 of the at least one compression spring member 1041 is stationary and fixedly connected to the base 1012, and the other end portion 1063 of the at least one compression spring member 1041 is engageable with the slidable/movable end portions 1049 of the articulated members 1021, 1027.

FIGS. 21-23 illustrate rear elevational views of the variable height desktop workstation system 1010, where the variable height platform 1014 is in a fully raised position in FIG. 21, where the variable height platform 1014 is in an intermediate position in FIG. 22, and where the variable height platform 1014 is in a fully lowered position in FIG. 23.

When the variable height platform 1014 is in the fully raised position of FIG. 21, the extension spring member 1039 is fully compressed and the lift mechanism 1016 is disengaged from the at least one compression spring member 1041. For the positions of the variable height platform 1014 between the position of FIG. 21 and the position of FIG. 22, the expansion spring member 1039 provides a linear constant spring force. That is, for the positions of the variable height platform 1014 between the position of FIG. 22 and the position of FIG. 21, only the extension spring member 1039 is configured to provide the secondary force assist. The at least one compression spring member 1041 is in its original, uncompressed state from the position of FIG. 21 to the intermediate position just before the position of FIG. 22.

When the variable height platform 1014 is moving downwards in the direction of arrow D from position in FIG. 21 to position in FIG. 22, the extension spring member 1039 expands in a linear fashion while the lift mechanism 1016 creates a variable force leverage curve. That is the reason why an additional compression spring(s) are used in the present patent application. The additional compression spring(s) are configured to "blend", adjust for, or "bridge" the force curve to be as linear as possible with this type of lift mechanism 1016 especially when the variable height platform device 10 is executed as a manually operated unit.

When the variable height platform 1014 is in the intermediate position of FIG. 22, the extension spring member 1039 is extended (but not fully extended) and the at least one compression spring member 1041 is engaged. In one embodiment, the at least one compression spring member 1041 is configured to provide a compressive force to the lift mechanism 1016 so as to soften a landing of the variable height platform 1014 into the fully lowered position of FIG. 23. For example, the compression spring 1041 is starting to compress in the position of FIG. 22. That is, the compression spring member 1041 adds additional compression force to soften the landing of the variable height platform 1014.

When the variable height platform 1014 is in the fully lowered position of FIG. 23, the extension spring member 1039 is fully expanded and the at least one compression spring member 1041 is fully compressed. In one embodiment, the at least one compression spring member 1041 is configured to provide a force assist to the lift mechanism 1016 during an initial phase when the variable height platform 1014 is being moved from the fully lowered position of FIG. 23 to the raised position of FIG. 21 or FIG. 22 so as to reduce/lower the force required to lift the variable height platform 1014 from the fully lowered position of FIG. 23 to the raised position of FIG. 21 or FIG. 22.

For example, the fully compressed compression spring member 1041 in FIG. 23 provides a force assist to the lift mechanism 1016 at the beginning when the variable height platform 1014 is being moved from the fully lowered position of FIG. 23 to the raised position of FIG. 21 or FIG. 22. That is, the fully compressed compression spring member 1041 in FIG. 23 helps to add additional force when raising the variable height platform 1014 and compensates for non-linear force translation by the lift mechanism 1016.

Energy released in lowering the lift mechanism 1016 and the variable height platform is stored the compression spring member 1041, and subsequently used in raising the lift mechanism 1016 and the variable height platform is stored the compression spring member 1041. Compensation is provided for the varying mechanical advantage provided by the scissors lift mechanism 1016, so that the stored energy operates smoothly on the lift mechanism 1016 and the variable height platform is stored the compression spring member 1041 throughout the entire operating range of the lift mechanism 1016 and the variable height platform is stored the compression spring member 1041.

Figure 26:
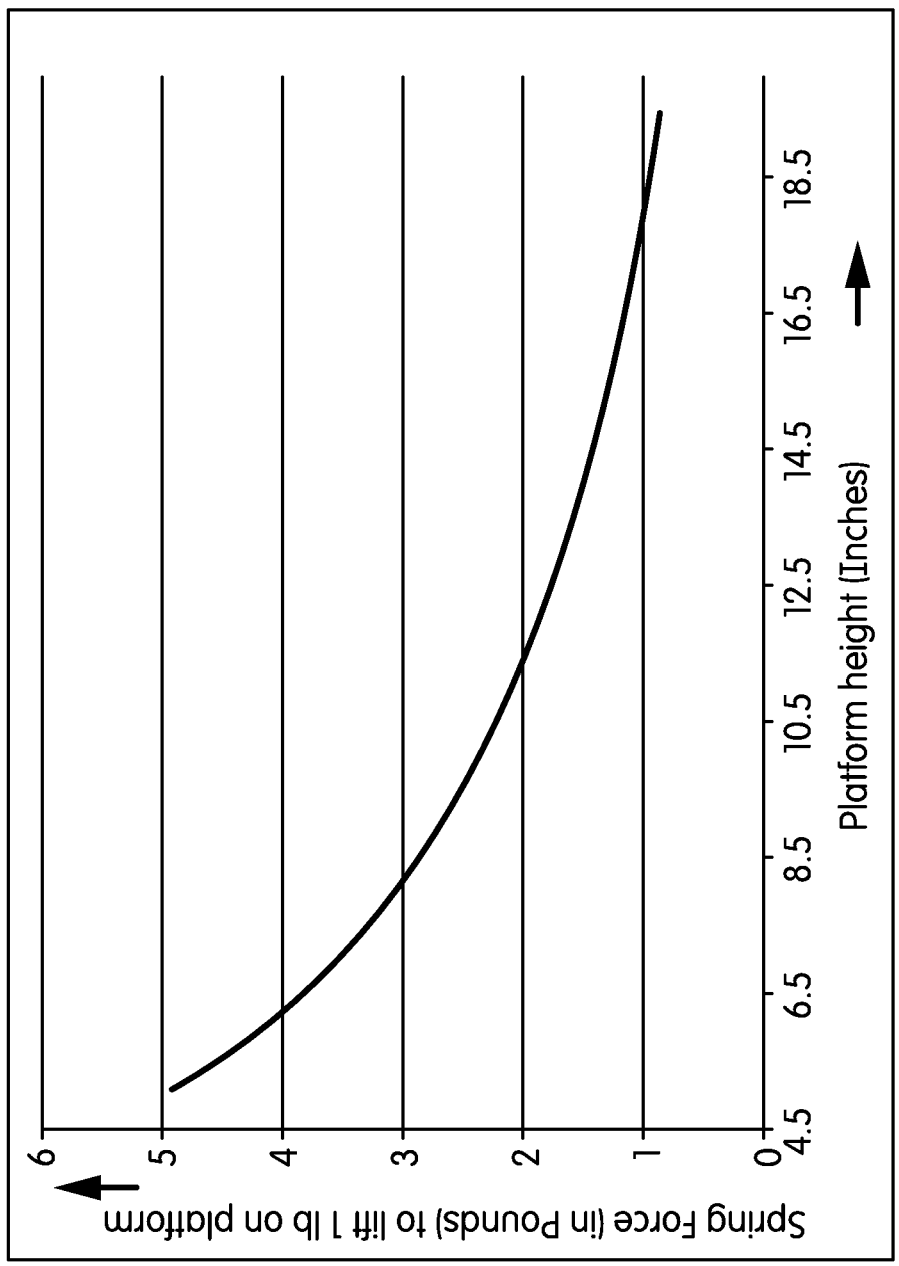
FIG. 26 is an exemplary graphical illustration showing a spring force required to lift one pound disposed on the variable height platform.

FIG. 26 is an exemplary graphical illustration showing a spring force required to lift the variable height platform with one pound weight positioned thereon. The graph in FIG. 26 illustrates, on its vertical Y-axis, spring force (measured in pounds) required to lift the variable height platform with one pound weight positioned thereon and illustrates height of the variable height platform (in inches) on its horizontal X-axis.

As shown in FIG. 26, it takes approximately five pounds of spring force to lift the weight of one pound positioned on the variable height platform when the variable height platform is in the least advantageous position. For example, the fully lowered position of the variable height platform may be its least advantageous position. In one embodiment of the present patent application, the compression spring is activated to help the scissors lift mechanism to move upwards from the fully lowered position of the variable height platform.

As shown in FIG. 26, once the lift mechanism is at a more advantageous leverage angle, the spring force required per pound of lift drops dramatically. For example, when the variable height platform is in fully raised position or is in an intermediate position (e.g., between the intermediate position of FIG. 22 and the fully raised position of FIG. 21), the lift mechanism is at the more advantageous leverage angle. In one embodiment, the force of the extension spring is enough to assist the lift assembly from that point on (e.g., the intermediate position of FIG. 22 to the fully raised position of FIG. 21) to ensure a smooth transition and continued assistance to the source of the exerting controlling force (e.g., manually or motorized or motor assisted forces) which would control and move the variable height platform upwards or downwards.

Figure 27:
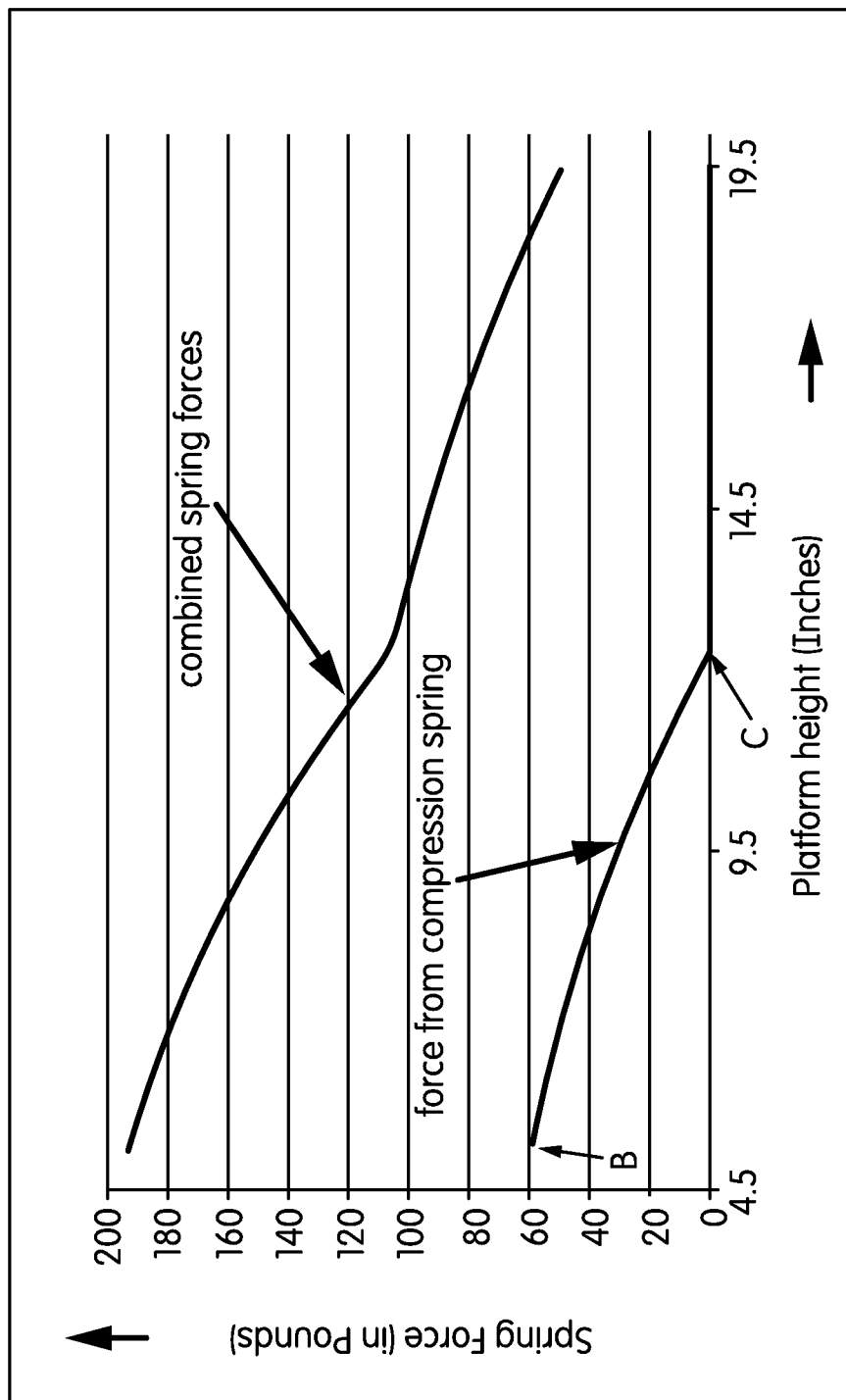
FIG. 27 is an exemplary graphical illustration showing a force provided by a compression spring and combined spring forces provided by a spring arrangement to move the variable height platform in accordance with an embodiment of the present patent application.

FIG. 27 is a graphical illustration showing a force provided by compression spring and combined spring forces provided by the spring arrangement to move the variable height platform 1014. The graph in FIG. 27 illustrates, on its vertical Y-axis, spring force (measured in pounds) required to lift the variable height platform 1014 and illustrates height of the variable height platform 1014 (in inches) on its horizontal X-axis.

As shown in FIG. 27, the compression spring adds to the total spring force only when the lift mechanism is in the area (e.g., positions of the variable height platform between position corresponding to point B and position corresponding to point C) where it generally takes two to five times spring force to generate a pound of lift.

Figure 28:
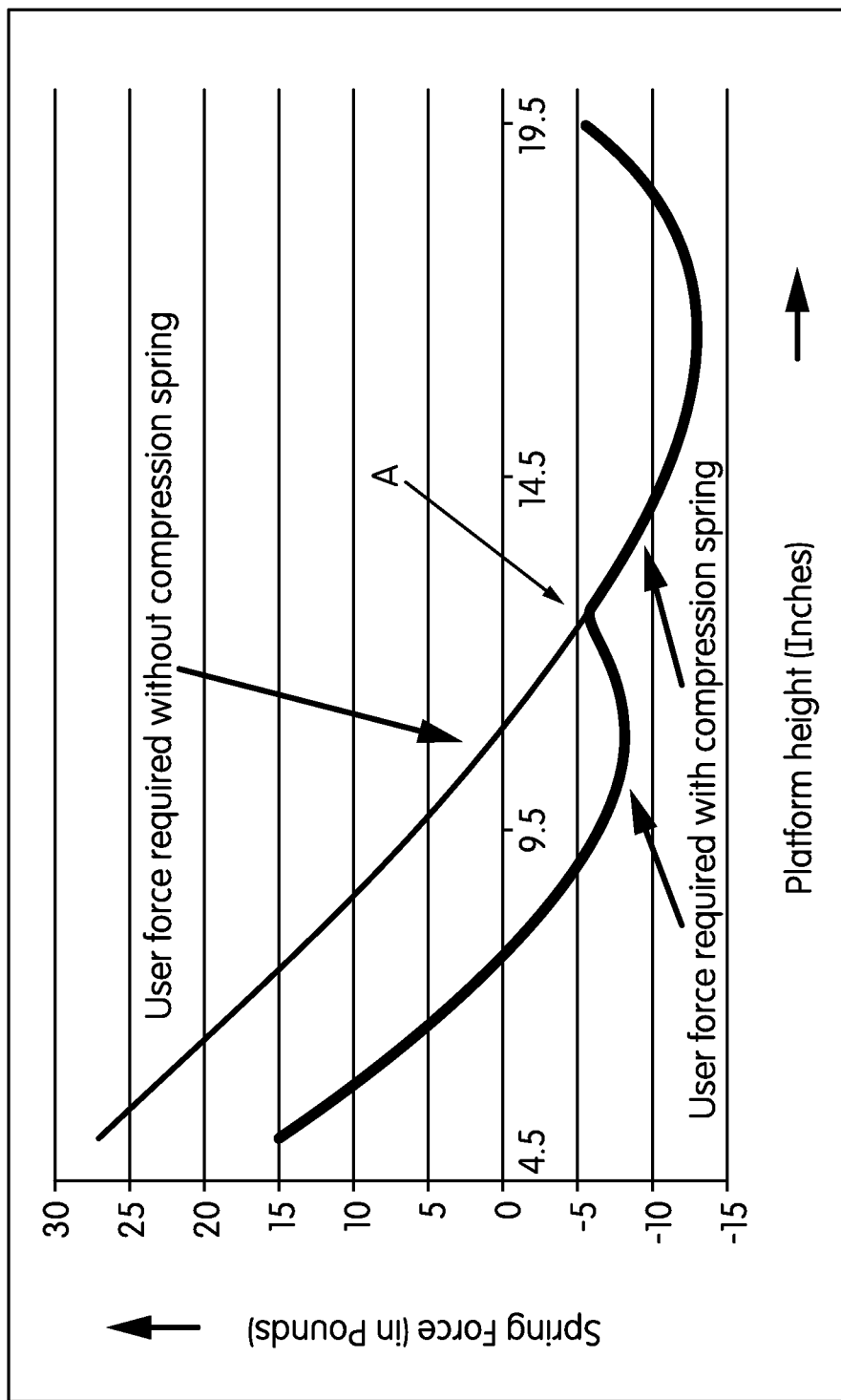
FIG. 28 is an exemplary graphical illustration showing a force required to move the variable height platform with and without the compression spring in accordance with an embodiment of the present patent application.

FIG. 28 is a graphical illustration showing the force required to move the variable height platform 1014 with the compression spring and without the compression spring. The graph in FIG. 28 illustrates, on its vertical Y-axis, spring force (measured in pounds) required to lift the variable height platform 1014 and illustrates height of the variable height platform 1014 (in inches) on its horizontal X-axis.

As can be clearly seen in FIG. 28, the force required to move/lift the variable height platform 1014 is higher without the compression spring, especially, when the variable height platform is at its fully lowered position, closer to its fully lowered position or in a position between the position shown in FIG. 22 and the fully lowered position. If the force of the extension spring is increased to reduce the initial lifting force (without the compression spring), a considerable negative force by the user would be needed as the variable height platform is being raised.

Once the variable height platform 1014 is at a more advantageous leverage position (e.g., a position corresponding to point A shown in FIG. 28 or positions to the right hand side of point A), the force required to move/lift the variable height platform is the same for both with and without the compression spring. For example, the more advantageous leverage position of the variable height platform may include a position between the position of the variable height platform in FIG. 22 and position of the variable height platform in FIG. 21.

Referring to FIGS. 17-20, the variable height desktop workstation system 1010 includes a latch mechanism 1091 that is configured to releasably latch the variable height platform 1014 at the fully lowered position (e.g., FIG. 23), the fully raised position (e.g., FIG. 21) or a position therebetween (e.g., FIG. 22). The latch mechanism 1091 may include a latch member 1093, a latch engaging portion 1095, and an actuator 1097.

The latch member 1093 may be connected to one of the lift mechanism 1016 and the variable height platform 1014. In one embodiment, the latch member 1093 is connected to the variable height platform 1014. The latch member 1093 may include protruding members or pins 1101.

The latch engaging portion 1095 is connected to the other of the lift mechanism 1016 and the variable height platform 1014. In one embodiment, the latch engaging portion 1095 is connected to the lift mechanism 1016. The latch engaging portion 1095 may include a saw tooth rack 1103. The saw tooth rack 1103 is connected to the moveable/slidable pin member 1087 (that connects the moveable/slideable end portions 1047 of the lift assembly 1016) such that the saw tooth rack 1103 is configured to move or slide along with moveable/slidable pin member 1087. The saw tooth rack 1103 may include a plurality of slots 1111 that are configured to engage with the pins 1101 to releasably latch the variable height platform 1014.

In one embodiment, the actuator 1097 of the latch mechanism 1091 is configured to selectively engage the latch member 1093 with the latch engaging portion 1095 to releasably latch the variable height platform 1014 at the fully lowered position (e.g., FIG. 23), the fully raised position (e.g., FIG. 21) or a position therebetween (e.g., FIG. 22).

The actuator 1097 may include handles 1099, connector rods 1105, and cam members 1107. In illustrated embodiment, the actuator 1097 includes two handles 1099, two connector rods 1105, and two cam members 1107. Two handles 1099 may be disposed on both ends of the variable height platform 1014. Each connector rod 1105 is configured to connect to the corresponding handle 1099 at one end portion and to connect to the corresponding cam member 1107 at the other end portion. In another embodiment, the actuator 1097 includes one handle, one connector rod, and one cam member.

In one embodiment, the latch mechanism 1091 includes cam slots 1109 disposed on the variable height platform 1014. The cam slots 1109 are configured to enable the pins 1101 (disposed on the cam members 1107) to pass therethrough. The cam slots 1109 are also configured to enable the pins 1101 (disposed on the cam members 1107) move between the latch and unlatch positions.

In one embodiment, the latch handles 1099 are connected to the moveable platform portion 1014 (that goes up and down). In one embodiment, the connector rods 1105, the cam members 1107, and the pins 1101 disposed on the cam members 1107 are also connected to the moveable platform portion 1014. In one embodiment, the saw tooth rack 1103 is connected to a portion of the lift mechanism 1016.

The operation of the latch mechanism 1091 is described with respect to the FIGS. 17-20. By actuating the latch mechanism 1091 from both sides (e.g., by pressing the latch handles 1099 on both sides) of the variable height desktop workstation system 1010 in unison, the latch mechanism 1091 is released. This allows the variable height platform 1014 to advance either upwards or downwards from its original position to a new position. A controlling force (e.g., a manual force) may be exerted on the variable height platform 1014 to facilitate the variable height platform 1014 to move upwards or downwards.

That is, when the latch handles 1099 on both sides of the variable height platform 1014 are actuated in unison, the connector rods 1105 connected to the latch handles 1099 move. The movement of the connector rods 1105 causes the cam members 1107 to rotate. The rotation of cam members 1107 causes the pins 1101 disposed thereon to move in the cam slots 1109 to disengage from the slots 1111 of the saw tooth rack 1103. Once the latch mechanism 1091 is released (i.e., the pins 1101 are disengaged from the slots 1111 of the saw tooth rack 1103), the variable height platform 1014 may be moved either upwards or downwards from its original position to a new position. A controlling force by the prime mover may be exerted on the variable height platform 1014 to facilitate the variable height platform 1014 to move upwards or downwards.

By releasing the latch mechanism 1091 (i.e., by releasing the latch handles 1099), the variable height platform 1014 remains at the desired level. That is, when the latch handles 1099 on both sides of the variable height platform 1014 are released in unison, the connector rods 1105 connected to the latch handles 1099 move in a direction opposite to its direction when the latch mechanism 1091 was being actuated). The movement of the connector rods 1105 causes the cam members 1107 to rotate (also in a direction opposite to its direction when the latch mechanism 1091 was being actuated). The rotation of cam members 1107 causes the pins 1101 disposed thereon to move in the cam slots 1109 to engage with different set of slots 1111 of the saw tooth rack 1103. Once the latch mechanism 1091 is released (i.e., the pins 1101 are engaged with different set of slots 1111 of the saw tooth rack 1103), the variable height platform 1014 is latched/locked in the new position (at the desired level).

In one embodiment, the actuator 1097 may be any actuator including, but not limited to, a hydraulic, a pneumatic, an electric, or other type of actuators as would be appreciated by one skilled in the art. In one embodiment, the latch member and the latch engaging member may have other shapes and configurations as would be appreciated by one skilled in the art.

In one embodiment, the variable height desktop workstation system 1010 includes a motor (e.g., motor 1065 of FIG. 25) that is configured to provide limited adjustment movements to the variable height platform 1014, when the variable height platform is in the raised position, to change the position of a user. In one embodiment, the limited adjustment movements to the variable height platform 1014 may be small or micro movements of the variable height platform 1014 within an acceptable predetermined range (e.g., about two inches) of the user's desired upper (standing) and lower (sitting) positions of the variable height platform 1014.

For example, the limited adjustment movements may be within +/−10% of the platform height (above the desktop) selected by the user doing raising also. Other ranges like +/−5% or +/−15% may also be used. In one embodiment, the user may input a desired platform height (above the desktop) using an user interface.

Small/micro movements of the variable height platform 1014 within the optimal standing or sitting heights are advantageous to the user. This feature of the variable height desktop workstation system 1010 is configured to operate on the motorized version (e.g., as shown in FIG. 25) of the variable height desktop workstation system 1010. In one embodiment, the desired upper (standing) and lower (sitting) positions for the variable height platform 1014 for a user are observed or received from the user. These desired settings are then saved into the memory of the workstation system 1010. Within these desired settings of the user, the height of the variable height platform 1014 is configured to vary automatically and seemingly randomly within an acceptable range (e.g., two inches) by moving a quarter of an inch, then one inch, and then reversing itself one inch, and then quarter inch etc. These small/micro movements of the variable height platform 1014 may be slowed or adjusted so as to make the user unaware that the variable height platform 1014 is actually changing its state and to not interfere with the user's daily tasks yet still aid the user as intended by this feature.

In one embodiment, referring to FIG. 9, the variable height desktop workstation system 1010 also includes a sensor arrangement 1113 that is operatively connected to the variable height platform 1014, and a display device 1115 with a processor 1117. The sensor arrangement 1113 is configured to sense the position and/or movement of a user on, above and around the variable height platform 1014 for outputting data to determine how the user is positioned on, above and around the variable height platform in comparison to a predetermined target position. In one embodiment, the structure, configuration and operation of the sensor arrangement 1113 are similar to that of the sensors 22*a*, 22*b* and 22*c* as shown in and described with respect to FIG. 9. In one embodiment, the sensor arrangement 1113 may include the sensors 22*a*, 22*b* and 22*c*.

The processor 1117 is configured to: receive the data from the sensor arrangement 1113, compare the received data to the predetermined target position, and display an indication of the comparison to the user. For example, the processor 1117 is configured to compare the data against the user's activity preferences while taking into consideration the user's experience curve. This helps to ensure the variable height desktop workstation system 1010 properly recommends when the user should change states/positions. These recommendations may be determined by the following, or any combination of the following: sensor readings/data, position of the variable height platform 1014, how much active time the user has spent at certain (sitting/standing) positions as compared to the user's experience curve and their preference settings.

In one embodiment, the sensors 1113 may also be used in the non-motorized version of the variable height desktop workstation system 1010. For example, as the sensors 1113 do not use a lot of power, the sensor 1113 may be powered by a USB cable or a battery in the non-motorized or manual version of the variable height desktop workstation system 1010.

In the coaching modes of the prior art (i.e., in a motorized or a motor assisted unit), anything less than one inch of movement is considered smaller or "micro-movement," whereas anything larger than one inch of movement would be significant enough for the user to notice. In one embodiment, in the present patent application, movement larger than 1 inch could be used to encourage whole body engagement of the user to reposition himself/herself. For the manual or non-motorized devices of the present patent application, the device may be configured to trigger visual and/or audible indication to encourage the user to reposition himself/herself depending on what mode the user picked.

Thus, the "smart" platform device with the integrated surface movement detection is disclosed in the present patent application. A work surface of the device has the capability to detect movement upon and over it and the active use of objects across it. This is achieved through the device's ability to detect body and object movement on the primary work surface of the device, through a control means which can determine when to suggest to a user (e.g., by visual and audio means), to become more active and alternatively to become less active. This device may take these detected movements upon and above the primary work surface and by the use of the control means, determine which automatic suggestions to output to the user for the given device configuration and a given situation along with the user's setting and preferences. This "smart" platform device suggests the user to raise one's activity level, to move, to raise the work surface and/or to walk around. Alternatively, this "smart" platform device may suggest the user to lessen activity, to rest, to lower the work surface and to sit while working. This work surface can also be actuated by way of an integrated motor so as to use the inputs of integrated surface movement sensors and the control means to determine which automatic suggestions (e.g., visual and audio means) and/or mechanized movements to output to the user for the given device configuration and situation while taking into consideration the user's settings and preferences.

The spring arrangement 1018 of the present patent application is configured to adjust and compensate for the force curve of the scissors type lift mechanism 1016 so as to aid in the reduction of the controlling force needed to move the variable height platform 1014. The controlling force may be a manual, motor, hydraulic, or pneumatic. The secondary force assist that adjusts and compensates for the force curve of the lift mechanism 1016 may be provide by an adjustable force sensing motor assist arrangement, a variable or an adjustable force spring assist arrangement, a pneumatic assist arrangement, a hydraulic assist arrangement, a spring assist arrangement or a combination of any mentioned or similar force assist devices configured to assist the primary force generator (or prime mover) in moving and adjusting the variable height platform 1014. The system 1010 thus provides a primary control force and a secondary force assist. The secondary force assist device 1018 is configured to allow a more consistent force exerted onto the lift mechanism 1016 so as to eliminate any undesired sudden changes of force required to move the variable height platform 1014 through its full motion range.

The illustrations of the described embodiments should not be taken as restrictive in any way since a myriad of configurations and methods using the underlying present application may be realized from what has been revealed in the present patent application.

The listed products, features and embodiments described in this present patent application should not be considered as limiting in any way and it will be obvious from the described present application how the variable height platform device and the described features may be re-configured to enhance nearly any relatively flat platform device that is designed for an operator to interact upon it. The embodiments of the present patent application should not be limiting, these mechanisms and features may be applied to desktop and tabletop configurations (as shown in this present patent application) but can also be applied and built into desktops, tabletops and movable portable carts.

The simplified illustrations are representative of possible construction and mechanical methods to obtain the desired features. The location of any detail or material may be constructed in such a way to relocate its position as shown in the simplified illustrations. The relocation or alternative design and placement of certain features from the referred to positions by description or illustrated in this present patent application are covered by this present patent application as well.

The foregoing illustrated embodiments have been provided to illustrate the structural and functional principles of the present patent disclosure and are not intended to be limiting. To the contrary, the present patent disclosure is intended to encompass all modifications, alterations and substitutions within the spirit and scope of the present disclosure.

What is claimed is:

1. A variable height workstation system comprising:
a base;
a variable height platform;
a lift mechanism configured to move the variable height platform within a range of motion between a fully lowered position and a raised position; and
a sensor arrangement operatively connected to the variable height platform,
wherein the sensor arrangement is configured to sense the position and movement of a user on, above and around the variable height platform for outputting data to determine how the user is positioned on, above and around the variable height platform in comparison to a predetermined target position,
wherein the sensor arrangement is configured to sense the position and movement of the user on, above and around the variable height platform and through one or more sensor zones of the sensor arrangement, and wherein the one or more sensor zones of the sensor arrangement are disposed across the variable height platform, and
wherein the one or more sensor zones are a plurality of sensor zones comprising overlapped zones of sensors with varied sensitivity, and wherein, as a body portion of the user moves around, into and through the overlapped sensor zones, the sensor arrangement is configured to detect varied signals levels from the associated sensors to determine how the user is positioned on, above and around the variable height platform in comparison to the predetermined target position.

2. The variable height workstation system of claim 1, wherein the sensor arrangement includes an active movement sensor arrangement.

3. The variable height workstation system of claim 1, wherein the sensor arrangement includes a surface movement sensor arrangement that is integrated in the variable height platform.

4. The variable height workstation system of claim 1, wherein the lift mechanism comprises a plurality of articulated members.

5. The variable height workstation system of claim 1, wherein the sensor arrangement includes the sensors each having a sensor zone of the plurality of sensor zones adjacent the variable height platform, the sensor arrangement including a processor coupled to the sensors and configured to process the data to determine how the user is positioned on, above and around the variable height platform in comparison to said predetermined target position based on the position and movement of the user around, into and through the plurality of sensor zones.

6. A variable height workstation system comprising:
a base;
a variable height platform;
a lift mechanism configured to move the variable height platform within a range of motion between a fully lowered position and a raised position;
a sensor arrangement operatively connected to the variable height platform; and
a display device with a processor,
wherein the sensor arrangement is configured to sense the position and movement of a user on, above and around the variable height platform for outputting data, and
wherein the processor is configured to:
receive the data from the sensor arrangement,
compare the received data to a predetermined target position, and
display an indication of the comparison to the user,
wherein the sensor arrangement is configured to sense the position and movement of the user on, above and around the variable height platform and through one or more sensor zones of the sensor arrangement, and wherein the one or more sensor zones of the sensor arrangement are disposed across the variable height platform, and
wherein the one or more sensor zones are a plurality of sensor zones comprising overlapped zones of sensors with varied sensitivity, and wherein, as a body portion of the user moves around, into and through the overlapped sensor zones, the sensor arrangement is configured to detect varied signals levels from the associated sensors to determine how the user is positioned on, above and around the variable height platform in comparison to the predetermined target position.

7. The variable height workstation system of claim 6, wherein the sensor arrangement includes an active movement sensor arrangement.

8. The variable height workstation system of claim 6, wherein the sensor arrangement includes a surface movement sensor arrangement that is integrated in the variable height platform.

9. The variable height workstation system of claim 6, wherein the lift mechanism comprises a plurality of articulated members.

10. The variable height workstation system of claim 6, wherein the sensor arrangement includes the sensors each having a sensor zone of the plurality of sensor zones adjacent the variable height platform,
wherein the processor is coupled to the sensors and is configured to process the data to determine how the user is positioned on, above and around the variable height platform in comparison to said predetermined target position based on the position and movement of the user around, into and through the plurality of sensor zones.

* * * * *